United States Patent
Siddiq

(10) Patent No.: US 10,749,828 B2
(45) Date of Patent: *Aug. 18, 2020

(54) SYSTEMS AND METHODS FOR PRESENTING EVENT NOTIFICATIONS, BASED ON TRENDING COMMUNICATIONS, ON DEVICES NOTWITHSTANDING A USER INSTRUCTION TO DISABLE EVENT NOTIFICATIONS

(71) Applicant: ROVI Guides, Inc., San Jose, CA (US)

(72) Inventor: Abubakkar Siddiq, Methuen, MA (US)

(73) Assignee: Rovi Guides, Inc., San Jose, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 15/920,657

(22) Filed: Mar. 14, 2018

(65) Prior Publication Data

US 2019/0288970 A1    Sep. 19, 2019

(51) Int. Cl.
| | |
|---|---|
| H04L 12/58 | (2006.01) |
| G06F 3/0484 | (2013.01) |
| G06F 3/0481 | (2013.01) |
| G06F 3/0488 | (2013.01) |
| G06F 3/0482 | (2013.01) |

(52) U.S. Cl.
CPC .......... *H04L 51/12* (2013.01); *G06F 3/04817* (2013.01); *G06F 3/04847* (2013.01); *G06F 3/04883* (2013.01); *H04L 51/043* (2013.01); *H04L 51/24* (2013.01); *H04L 51/32* (2013.01); *G06F 3/0482* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen |
| 6,564,378 B1 | 5/2003 | Satterfield |
| 7,165,098 B1 | 1/2007 | Boyer |
| 7,313,617 B2 | 12/2007 | Malik |
| 7,761,892 B2 | 7/2010 | Ellis |

(Continued)

FOREIGN PATENT DOCUMENTS

WO    WO 2014/004524    1/2014

OTHER PUBLICATIONS

International Search Report and Written Opinion in Application No. PCT/US2019/022030, dated May 14, 2019 (15 pages).

*Primary Examiner* — Davoud A Zand
(74) *Attorney, Agent, or Firm* — Haley Guiliano LLP

(57) ABSTRACT

Systems and methods are provided for generating for presentation information about an event on a device that is in a mode of operation that prevents presentation of information about events. This may be accomplished by a media guidance application that receives a command, on a user device associated with a first user, to place the user device in a do not disturb mode. The media guidance application receives, while the user device is in the do not disturb mode, information about an event and determines whether the event is relevant to the user. The media guidance application then determines whether the event is trending among a plurality of users associated with the user and, if trending, displays, while the user device is in the do not disturb mode, a notification about the event to the user on the user device.

20 Claims, 15 Drawing Sheets

FIG. 6

(56) References Cited

U.S. PATENT DOCUMENTS

| | | |
|---|---|---|
| 8,046,801 B2 | 10/2011 | Ellis |
| 8,823,507 B1 | 9/2014 | Touloumtzis |
| 8,998,720 B2 | 4/2015 | Dinka |
| 9,075,435 B1 | 7/2015 | Noble |
| 2002/0174430 A1 | 2/2002 | Ellis |
| 2003/0046421 A1 | 3/2003 | Horvitz |
| 2005/0251827 A1 | 7/2005 | Ellis |
| 2008/0214148 A1* | 9/2008 | Ramer ................ G06Q 30/02 455/414.1 |
| 2009/0207979 A1* | 8/2009 | Russell ................ G06Q 30/02 379/85 |
| 2010/0153885 A1 | 6/2010 | Yates |
| 2011/0258049 A1* | 10/2011 | Ramer ............ G06Q 30/0273 705/14.66 |
| 2015/0215250 A1 | 7/2015 | Dinka |
| 2016/0062590 A1 | 3/2016 | Karunamuni et al. |
| 2017/0099592 A1 | 4/2017 | Loeb et al. |

\* cited by examiner

SYSTEMS AND METHODS FOR PRESENTING EVENT NOTIFICATIONS, BASED ON TRENDING COMMUNICATIONS, ON DEVICES NOTWITHSTANDING A USER INSTRUCTION TO DISABLE EVENT NOTIFICATIONS

BACKGROUND

Users often make use of applications on devices, such as cellular phones, mobile tablets, laptops, and personal computers, while connected to communication networks and using applications, such as social networking applications, that provide notifications. These notifications, often referred to as push notifications, may arrive in inopportune times that interrupt a user's concentration, enjoyment of other activities, or important meetings where the user desires no interruptions. To avoid interruptions, users may place devices in a mode of operation that prevents notifications from being displayed, often called "do not disturb" modes. While "do not disturb" modes are useful for preventing undesired notifications, these modes of operation also limit a device's usefulness to notify users close in time of events particularly relevant to a user. Instead, a user may not learn of notifications until the device exits the "do not disturb" mode and provides the user with earlier, perhaps now irrelevant, notifications. Therefore, devices providing a "do not disturb" mode are not able to intelligently raise a notification, also referred to as an alert, to a user when the device is put in the "do not disturb mode."

SUMMARY

The advancement of computing devices, and proliferation of mobile devices in particular, has increased the potential that users are distracted by a constant barrage of notifications from various platforms. In response, mobile device manufacturers and computer manufacturers often provide modes of operation that prevent display of notifications or allow for customization of notifications. These modes often provide either binary modes of operation, either in do not disturb mode or not in do not disturb mode, or require extensive user configuration to tailor notification settings for every application that may provide notifications. Thus, a user may place a device into a mode of operation or configure a device in a way that the user may miss notifications that are important to the user and the existing systems fail to solve the problem of intelligently allowing for a notification to reach the user based on the user's preferences and the relative importance of the notification as measured by heuristics related to communications related to the notification. The solutions described herein provide a techniques and systems that allow a user to place a device in a do not disturb mode and still receive notifications that are important to the user for some events and, at the same time, block less pertinent notifications.

Accordingly, to overcome the problems created when alerting a user in computer systems, systems and methods for intelligently presenting event notification on devices are provided herein. For example, a device may be configured by a user to be in a do not disturb mode, i.e., a mode of operation that prevents notifications, while the user is watching a movie, in an important meeting, or at dinner with family members. While in the do not disturb mode, the device may receive communications, notifications, or messages pertinent to the user. For example, the device may have access to the user's social media feed, e.g., Twitter® feed and receive updates to the feed without displaying notifications of new messages to the user. The device may see that messages about the gold medal match for Woman's Ice Hockey between Team USA and Team Canada are trending and based on the user's preferences, the device may determine that hockey is relevant to the user's interests. Based on the frequency of the messages, the closeness of the social connections, the inferred importance of the event to the user, and/or attributes of the messages or event—such as the identity of the applications in use by people sending messages—the device may determine that a notification of the event should supersede, i.e., breakthrough, the do not disturb mode. Thus, the device may present a notification of the event to the user even when the device is placed in a do not disturb mode according to embodiments of the invention.

In some aspects of the disclosure, systems and methods are provided herein for generating for presentation information about an event on a device that is in a mode of operation that prevents presentation of information about events, i.e., a "do not disturb" mode. The media guidance application may receive, on the device, information about the event. For example, the media guidance application may receive text messages, social communications, or application notifications containing information about the gold medal match for Woman's Ice Hockey between Team USA and Team Canada.

In response to receiving the information about the event, the media guidance application may determine whether the device is configured to be in a mode of operation that prevents presentation of information about events. For example, the media guidance application may inspect configuration settings of the media guidance application or of a user equipment device that implements the media guidance application to determine whether the device has been configured, or placed, in do not disturb mode. In response to determining that the device is configured to be in a mode of operation that prevents presentation of information about events, the media guidance application may determine whether the event is relevant to a user. For example, the media guidance application may receive information about an ice hockey event that the media guidance application determines is relevant to the user based on the user's preferences for watching winter sports or based on other preferences as described further.

In response to determining that the event is relevant to the user, the media guidance application may further determine whether the event is trending among a plurality of users that share membership in a social group with the user. For example, the user may have several connections on a social media site, e.g., Twitter, that are sending communications about the event. In response to determining that the event is trending among the plurality of users that share membership in the social group with the user, the media guidance application may override the mode of operation that prevents presentation of information about events. For example, the media guidance application may disable the do not disturb mode or modify the mode to allow for notifications specific to the event.

The media guidance application may then generate, for presentation on the device, a notification containing information about the event. For example, the media guidance application may display a pop-up message on a user equipment device with a message about the event, for example showing a notification with a communication received from one of the members of the user's social group. Accordingly, the media guidance application may present a notification to a user for an event that is deemed important to the user, based on the fact that the event is trending within the user's social group, even though the user's device is in a do not disturb mode and, thus, the system may intelligently notify the user of pertinent events.

In some embodiments, the media guidance application may determine whether additional information about the event, including the communications received from the user's social connections, suggests that a media guidance application should present a notification to the user despite the media guidance application being in a do not disturb mode based on whether the event is trending among a plurality of users associated with the user. For example, the media guidance application may analyze the user's social groups and messages sent from various social connections of the user. Using the analysis, the media guidance application may determine that a quantity of messages about the gold medal match had been sent in a relatively short period indicating that gold medal match is trending. The media guidance application may, based on determining that the event is trending among the plurality of users associated with the user, display a notification about the event to the user while the media guidance application is in the do not disturb mode. By using the trending status of communications, the system may accurately determine that an event is of high importance to the user to warrant breaking through the do not disturb mode.

In some embodiments, the media guidance application may determine whether additional information about the event, including the communications received from the user's social connections, suggests that a media guidance application should present a notification to the user despite the media guidance application being in a do not disturb mode based on whether a threshold number of users among a plurality of users that share membership in a social group with the user are accessing an application associated with the event. For example, the media guidance application may access information associated with communications received from a user's social connections and determine that many of the user's social connections sent communications while using a media player to stream the gold medal match.

In some embodiments the threshold number of connections may be a percentage of the user's social connections, e.g., 20%, while in other embodiments it may be a set number, e.g. 15 social connections. Based on determining that the threshold number of users among the plurality of users that share membership in the social group with the user are accessing the application associated with the event, displaying, while the media guidance application is in the do not disturb mode, a notification about the event to the user on the media guidance application. Thus, the system disclosed herein may base notifications not just on the behavior of the user, i.e., whether the user's device is in a do not disturb mode, but also based on the behavior of the user's social connections, e.g., based on the applications active on other user's devices.

In some embodiments, the media guidance application may determine whether the event is relevant to a user according to the following process. The media guidance application may extract a keyword from the information about the event. For example, the media guidance application may extract a keyword from a short message service ("SMS") message using text mining techniques (e.g., named entity recognition, coreference, sentiment analysis, semantic analysis, etc.) to retrieve a pertinent keyword. The media guidance application may also retrieve preferences of the user. For example, the media guidance application may maintain a datastore with preferences a user has for favorite sports, favorite teams, favorite athletes, favorite movie genres, or favorite actors. The media guidance application compares the extracted keyword to the preferences of the user to determine, based on the comparison, whether the event is relevant to the user. For example, if the media guidance application extracts the keyword "hockey" from the information about the event then the media guidance applications compares the keyword hockey with the user's preferences for ice hockey as a favorite sport to determine that the event is relevant to the user. Thus, the user is not required to perform additional configuration to customize how notifications appear, instead the systems described herein may provide a convenient mechanism for determining relevant events for superseding a do not disturb mode.

In some embodiments, the media guidance application may determine whether the event is trending among a plurality of users that share membership in a social group with the user according to the following process. The media guidance application may identify the plurality of users that share membership in the social group with the user based on comparisons of the keyword with social group attributes of each of the plurality of users. For example, the user may belong to several social groups such as a group of connections that play a sport together, such as ice hockey, and social connections that live in the same geographic area, i.e., neighbors from a neighborhood and the extracted keyword, e.g., hockey, is related to the user's ice hockey social group. The media guidance application may identify members of the hockey social group as the plurality of users that share membership in the social group related to the event. The media guidance application may retrieve information about a plurality of communications that contain the keyword originating from the plurality of users. For example, the media guidance application may capture the date, time, location and/or other metadata for messages from a user's ice hockey social group that contain the keyword hockey. The media guidance application may determine whether a threshold number of the plurality of communications were sent within a predetermined time interval of one another. For example, the media guidance application may determine that 10 messages containing the keyword hockey were sent within 3 minutes from a user's ice hockey social group. By using the frequency of communications as related to each social group, the system herein can intelligently react to the messages sent within a social group based on the importance of each group to the user.

In some aspects of the disclosure, systems and methods are provided herein for generating for presentation information about an event on a device that is in a mode of operation that prevents presentation of information about events, i.e., a do not disturb mode. The media guidance application may receive, on the device, information about the event. For example, the media guidance application may receive text messages, social communications, and/or application notifications, containing information about the gold medal match for Woman's Ice Hockey between Team USA and Team Canada. In response to receiving the information about the event, the media guidance application may determine whether the device is configured to be in a mode of operation that prevents presentation of information about events. For example, the media guidance application may inspect configuration settings of the media guidance application or of a user equipment device that implements the media guidance application to determine whether the device has been configured, or placed, in do not disturb mode.

In response to determining that the device is configured to be in a mode of operation that prevents presentation of information about events, the media guidance application may determine whether the event is relevant to a user. For example, the media guidance application may receive information about an ice hockey event that the media guidance application determines is relevant to the user based on the user's preferences for watching winter sports or based on other preferences as described further. In response to determining that the event is relevant to the user, the media guidance application may determine whether a threshold number of users among a plurality of users that share membership in a social group with the user are accessing an application associated with the event. For example, the media guidance application may analyze information from the communications to determine that the user may have several social media connections using an application to stream the gold medal match for Woman's Ice Hockey between Team USA and Team Canada. In response to determining that the threshold number of users among the plurality of users that share membership in the social group with the user are accessing an application associated with the event, the media guidance application may override the mode of operation that prevents presentation of information about events. For example, the media guidance application may disable the do not disturb mode or modify the mode to allow for notifications specific to the event. The media guidance application may then generate, for presentation on the device, a notification containing information about the event. For example, the media guidance application may display a pop-up message on a user equipment device with a message about the event, for example showing a notification with a communication received from one of the members of the user's social group.

In some embodiments of the invention, the media guidance application determines whether a threshold number of users among a plurality of users that share membership in a social group with the user are accessing an application associated with the event according to the following process. The media guidance application identifies the plurality of users that share membership in the social group with the user based on comparisons of the keyword with social group attributes of each of the plurality of users as described above. The media guidance application may retrieve information about applications in use by the plurality of users. For example, the media guidance application may use metadata associated with communications from the plurality of users to determine the plurality of users were accessing a content provider's application to stream the gold medal match for Woman's Ice Hockey between Team USA and Team Canada. The media guidance application may then determine whether a threshold number of applications in use by the plurality of users are associated with the event. For example, the media guidance application may determine that 10 users in the user's ice hockey social group were using applications to stream the gold medal match.

In some embodiments, the media guidance application provides options to a user for how the media guidance application will override the mode of operation. The media guidance application generates for display on a user equipment device an option that indicates modifications to the mode of operation that prevents presentation of information about events. For example, the media guidance application may present user interface elements including an option to display notifications related to events for the user's ice hockey social group, an option to display notifications related to events for the user's ice hockey social group for a limited time window, and an option not to display notifications related to events for the user's ice hockey social group. The media guidance application receives a selection of the option from the user. For example, the media guidance application receives taps or clicks on the user interface elements. In response to receiving the selection of the option, the media guidance application modifies the mode of operation to allow information about the event to be presented to the user.

In some embodiments, the media guidance application may receive a selection indicating the media guidance application should allow presentation of information about communications originating from the plurality of users that share membership in the social group with the user. For example, the media guidance application may receive a selection indicating that the media guidance application should display notifications related to events for the user's ice hockey social group. In some embodiments, the media guidance application may present other options that modify the time period for which the do not disturb setting is modified as it relates to the event and/or social group. For example, the media guidance application may present an option to modify the do not disturb setting for 30 minutes before the do not disturb setting reverts to preventing notifications for the given event and/or social group. Therefore, the media guidance application may receive a second selection of a second option from the user and, in response to receiving the selection of the second option, the media guidance application may modify the mode of operation to allow presentation of information communications originating from the plurality of users that share membership in the social group with the user for a time interval indicated by a selection of a second option.

In some embodiments, the media guidance application may present notifications to the user in a manner that provides the user with context for notification. Context for a notification that breaks through a user's do not disturb settings may be appreciated by users that would not otherwise expect a notification to appear on a device. The media guidance application may determine a context of the event based on the keyword extracted from the information about the event. For example, the media guidance application may analyze the hockey keyword and determine that the event is related to sports or, more particularly, to ice hockey. The media guidance application may retrieve a plurality of icons. For example, the media guidance application may maintain, or remotely access, a datastore containing notification icons for different contexts including an email envelope, an image of a calendar, and an image of an ice hockey player. The media guidance application may identify a context icon from the plurality of icons based on the determined context of the event. For example, using a lookup table or other metadata to cross-reference the available items with the identified context. The media guidance application may generate, for presentation on the device, the context icon. For example, when generating a notification about the gold medal ice hockey game, the media guidance application may include an icon of an ice hockey player to represent the context of the notification.

In some embodiments, the media guidance application may further select a context icon based on a priority level for notification. For example, a notification for an event that is trending more popularly may be displayed in a color commensurate with the determined popularity. The media guidance application may determine a priority level for the notification based on the number of the plurality of communications and a time interval between the origination of a first of the plurality of communications and a last of the plurality of communications. For example, the media guidance application may determine that several communications regarding the event in question were received in a short time period which indicates the notification should be given a high priority level; the priority level may be configured to be high based on receiving, for example, 6 messages in 2 minutes. The media guidance application may identify a set of icons from the plurality of icons based on the determined context, the plurality of icons comprising the context icon. For example, the media guidance application may identify several potential icons of an ice hockey player, based on the keyword, but each icon being in a different color such as green, yellow, and red. The media guidance application may identify attributes associated with each icon of the set of icons. For example, the media guidance application may identify an attribute of high priority for the red icon of hockey player, an attribute of medium priority for the yellow icon of hockey player, and an attribute of low priority for the green icon of hockey player. The media guidance application may compare the determined priority level with the attributes associated with each icon of the set of icons and select the context icon from the set of icons based on the comparison of the determined priority level with the attributes associated with each icon of the set of icons. For example, if the media guidance application determines the priority level of the notification is a high priority, then the media guidance application may select the red icon from the set of icons based on the attributes of the icons that indicate the red icon of the hockey player is for a high priority context.

In some embodiments, the media guidance application provides an interface to allow a user to cancel a notification after the media guidance application determines to display the notification despite being in a mode of operation that prevents notifications from being displayed. The media guidance application may generate, for presentation on the device, an icon that indicates a notification is available. For example, the media guidance application may display an icon on a user equipment device that indicates a notification is available, e.g., an icon of an ice hockey player to indicated that notification is available for the gold medal match for Woman's Ice Hockey between Team USA and Team Canada. The media guidance application may then receive, from the user, a user interface gesture. For example, the user may click an appropriate button or swipe an appropriate direction to indicate either the user would like to view the notification or would like to cancel the notification. The media guidance application may determine whether the user interface gesture indicates the notification should be cancelled. For example, the user may click an 'X' icon, a "Cancel" or "No" button, or swipe in a direction configured to indicate the notification should be cancelled. The media guidance application may, in response to determining that the user interface gesture indicates the notification should be cancelled, cancel additional notifications related to events trending within the social group. For example, the media guidance application may track the cancellation and use that information to prevent another related notification in the future.

In some embodiments, the media guidance application cancels additional notifications related to events trending within the social group according to the following process. The media guidance application stores an indication of the cancellation of the notification in association with the social group. For example, the media guidance application may store an indication that notifications for events related to the user's ice hockey social group should not supersede the current do not disturb mode. In response to receiving information about a second event that is determined to be trending within the social group, the media guidance application maintains the mode of operation that prevents presentation of information about events. For example, the media guidance application may receive information related to a men's ice hockey game while the device is in the do not disturb mode and determine that information was stored indicating that notifications for events related to the user's ice hockey social group should not supersede the current do not disturb mode.

In some embodiments, the media guidance application further generates notifications to include the content of a communication that was received from one of the plurality of users that share membership in the social group with the user. The media guidance application may identify a primary source from the plurality of users based on the number of first-level social connections the primary source has to other users of the plurality of users. For example, the media guidance application may inspect a social graph of the user's ice hockey social group to find a user with the most social connections within the group, i.e., a primary source or influencer. The media guidance application may identify a communication from the plurality of communications that originated from the primary source. For example, the media guidance application may locate a social message, e.g., a tweet, that came from the influencer. The media guidance application may then generate the notification to contain contents of the communication that originated from the primary source. For example, the media guidance application may use the specific contents or a portion of the contents of the influencer's communication for text within the notification.

In some embodiments, the media guidance application may provide an interface for a user to configure the number of messages and time interval used to determine whether communications within the user's social group are trending. The media guidance application may generate, for presentation on the device, a configuration interface comprising interface elements for receiving configuration settings corresponding with the threshold number of the plurality of communications and the predetermined time interval required to determine the event is trending. For example, the media guidance application may present a list of the user's social groups along with a configurable number of messages and a configurable amount of time that will be used to determine whether messages from that social group are trending. The media guidance application receives, by user interactions with the configuration interface, the configuration settings. For example, the media guidance application may receive a number of messages and amount of time from a spinner user interface for a specific social group. The media guidance application stores the configuration settings in a datastore.

In some embodiments, the media guidance application may further employ configuration settings related to social groups to determine whether notifications for a social group supersede a mode of operation that prevents notifications from being displayed. The media guidance application may generate, for presentation on the device, a configuration interface comprising interface elements for receiving configuration settings indicating a plurality of social groups to which the user is a member and whether trending events from each of the plurality of social groups can override the mode of operation that prevents presentation of information about events. For example, the media guidance application may present a list of social groups along with a check box, or other selection element, for selecting whether notifications for that social group can supersede a do not disturb mode. The media guidance application may receive, by user interactions with the configuration interface, the configuration settings and storing the configuration settings in a datastore. The media guidance application may, when overriding the mode of operation that prevents presentation of information about events further comprises, determine whether events trending in the social group of the plurality of the users are configured, based on the configuration settings, to override the mode of operation that prevents presentation of information about events. For example, when the media guidance application determines whether to override the mode of operation, the media guidance application may check whether the notifications for the associated social group are allowed to break through do not disturb mode.

In some embodiments, the media guidance application may further respond to determining that the threshold number of users among the plurality of users that share membership in a social group with the user are accessing applications associated with the event, by activating an application according to the following process. The media guidance application may identify an application context based on the information of about the event. For example, the media guidance application may identify that people are watching the gold medal match for Woman's Ice Hockey between Team USA and Team Canada and that an application context is identified for watching that event. The media guidance application may then identify an application associated with the event that is available to the user on the device. For example, the media guidance application may identify a video stream application capable of streaming the gold medal match for Woman's Ice Hockey between Team USA and Team Canada. The media guidance application may generate, for presentation, a user interface element to activate the application. For example, the media guidance application may present a confirmation screen before activating a streaming application. In response to receiving user interaction with the user interface element, the media guidance application activates the associated application with the identified application context.

In some embodiments, the media guidance application identifies the application associated with the event that is available to the user on the device according to the following process. The media guidance application retrieves plurality of indicators of applications capable of providing functions related to the identified application context. For example, the media guidance application may access a datastore that indicates several applications are capable of serving video content including the gold medal match for Woman's Ice Hockey between Team USA and Team Canada. The media guidance application determines that a plurality of applications identified in the plurality of indicators of applications are available for use on the device. For example, the media guidance application may access configuration information, or a datastore, that maintains information about applications available to the media guidance application, or otherwise installed on the user equipment device that implements the media guidance application. The media guidance application compares attributes of the plurality of applications available for use on the device with the preferences of the user. For example, the media guidance application may identify several applications available for streaming video content and determine that the user prefers one or more applications. The media guidance application selects the application associated with the event that is available to the user on the device based on the comparison of attributes of the plurality of applications available for use on the device with the preferences of the user.

In some embodiments, the media guidance application may to configure a device to be a do not disturb mode based on the present operation of the media guidance application. For example, the media guidance application may perform heuristic analysis of a user's preferred mode of operation of a device based on the operating conditions of the device. In some embodiments, the media guidance application may, upon playback of a media asset, determine characteristics of the media asset and the operating characteristics of the device playing the media asset. For example, when a user plays a movie from a streaming service, the media guidance application may obtain genre information about the movie and information about the devices current location. The media guidance application may correlate the characteristics of the media asset and the operating characteristics of the device playing the media asset with the user's history for placing the device in a do not disturb mode based in similar characteristics. For example, the media guidance application may use heuristics to analyze the user's history for placing a device into a do not disturb mode when playing similar content in a similar application to determine whether the present situation is one that correlates highly with placing the device in a do not disturb mode. Based on the correlation, the media guidance application may automatically configure the device to be in a do not disturb mode. In some embodiments, the media guidance application may provide a user interface to configure the user's preferences for automatically placing the device in a do not disturb mode. For example, the user may be presented with a list of different genres of content, different stream applications, different geographic locations and a setting for whether the user has a preference for placing the device into a do not disturb mode based on the respective options (e.g., a "yes", "no", or "no preference"). In such embodiments, the media guidance application may combine a heuristic approach based on the user's past preferences with an approach based on the user's explicit preferences or may replace the heuristic approach with an approach based only on the user's explicit preferences. In some embodiments, the user's preferences take precedence over the heuristic approach.

In some embodiments, the media guidance application may use the behaviors and preferences of other users, e.g., users from the user's social groups, to infer when to place the device in a do not disturb mode. For example, using techniques described above, the media guidance application may retrieve a user's social graph and query a service, or user devices associated with users in the social graph, for information related to those user's behavior histories for configuring their own devices into do not disturb modes along with characteristics of contents and devices' operation conditions to train a heuristic model. The media guidance application may infer one or more conditions from the other users' conditions are relevant to a user of the current device based on the relationship between the current user and the other users. For example, if a threshold amount of members of the hockey social group place devices in a do not disturb mode when playing back a hockey games, the media guidance application may infer that the current user would also prefer a device playing back a hockey game be automatically placed in do not disturb mode without using the current user's history or preferences.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
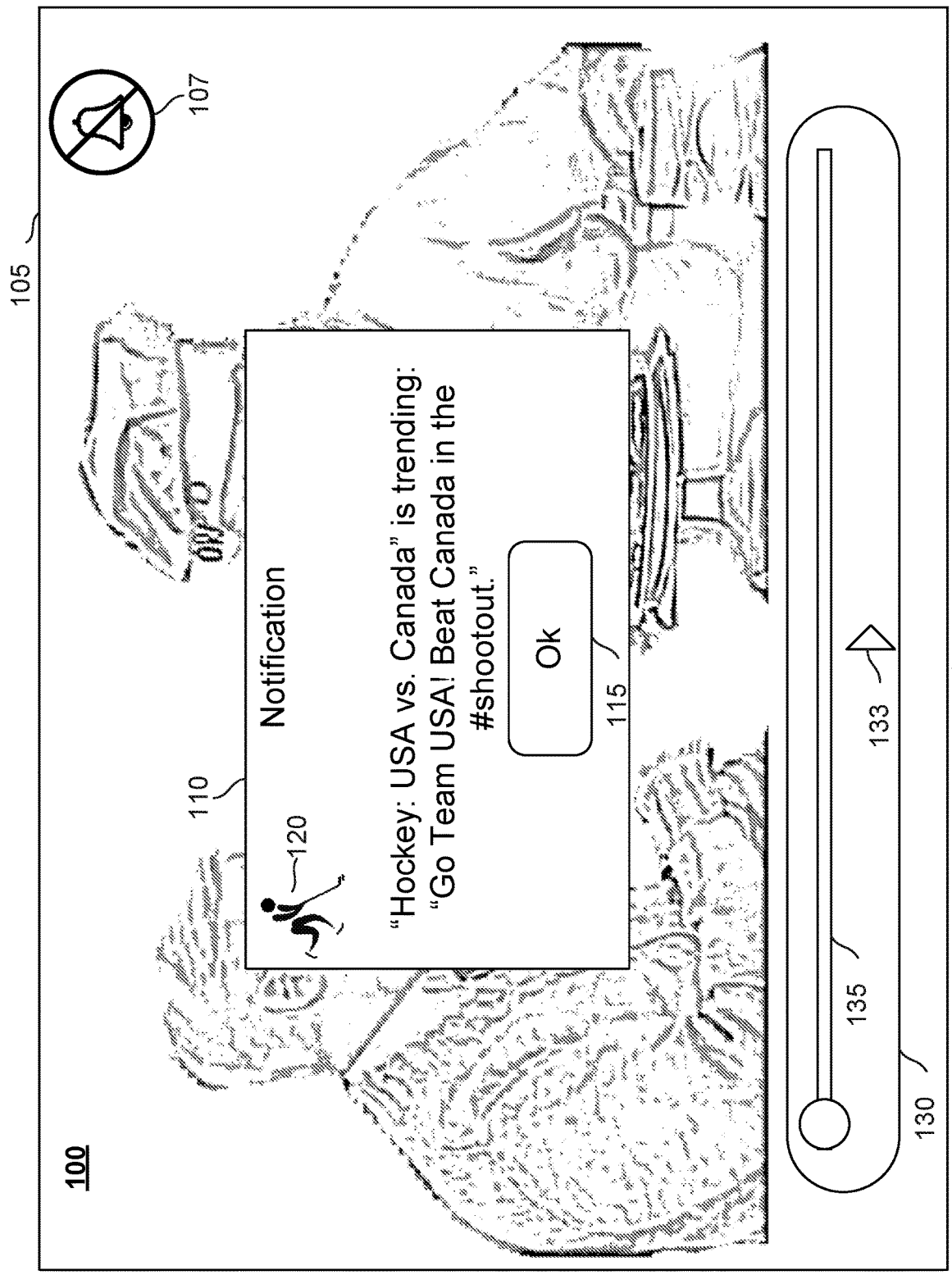
FIG. 1 depicts an illustrative embodiment of a display screen that may be used to display a notification on a device that is in mode that prevents presentation of notifications in accordance with some embodiments of the disclosure.

FIG. 1 depicts an illustrative embodiment of a display screen that may be used to display a notification on a device that is in mode that prevents presentation of notifications in accordance with some embodiments of the disclosure. FIG. 1 depicts a user equipment device 100 that implements a media guidance application 105 by control circuitry, which may be located in the user equipment, at a remote server, or distributed across the user equipment and the remote server. The functionality of user equipment, control circuitry, and the media guidance application is described in further detail with respect to FIGS. 4-7.

In FIG. 1, the media guidance application 105 is generating playback of a media asset. For example, the media guidance application 105 may be showing an episode of Mr. Roger's Neighborhood. In FIG. 1, the media guidance application 105 is depicted in a mode of operation that prevents presentation of information about events as indicted by user interface element 107. As used herein, do not disturb mode is used interchangeably with a mode of operation that prevents presentation of information about events to indicate modes such as silent, vibration only, display disabled, and/or disabling overlay of push notifications on a display. Furthermore, the descriptions made herein are with reference to the media guidance application 105 being in a do not disturb mode but the techniques described apply equally to systems in which the user equipment 100 is placed in the do not disturb mode. The media guidance application 105 depicts a video player screen 105 with playback controls 130 including a play control element 133 and time slider 135.

In FIG. 1, the media guidance application 105 may generate a notification of an event despite the media guidance application being in a mode of operation that prevents presentation of information about events in accordance with the techniques described below. In some embodiments, the media guidance application 105 receives a command from a user of the media guidance application 105 to place the media guidance application 105, or user equipment device 100 on which the media guidance application 105 is implemented, in a do not disturb mode. For example, the user may click an icon on a smartphone that places the smartphone in a do not disturb mode.

The media guidance application 105 may then receive, while the media guidance application 105 is in the do not disturb mode, information about an event. An event, as used herein, refers to the occurrence of a public or social occasion that is followed by users of social groups, e.g., a sports match or competition, a highlight from a sports match or competition, a news item, a social party, a concert, a play, and/or a weather pattern. For example, the media guidance application 105 may receive communications from a user's social connections discussing a sporting event such as the gold medal match for Woman's Ice Hockey between Team USA and Team Canada. The communications may come in the form of social media posts made by other users that are received by the media guidance application 105. In some embodiments, the communications may come in the form of background updates provided to the media guidance application 105 by a remote server. In still further embodiments, the media guidance application 105 may monitor a user's electronic communications (e.g., text messages, social media posts, email communications, voice mail messages, or visual media messages such as photo posts) systems to identify communications that contain information about an event.

The media guidance application 105 may determine whether the event is relevant to the user. For example, the user may have preferences related to favorite sports, favorite teams, or favorite athletes that indicate a preference for ice hockey. In some embodiments, the media guidance application 105 may maintain or access a data store that contains the user's interactions with media from which the media guidance application 105 may infer the user's preferences for content and/or events. In some embodiments, the user may be presented with user interface elements that allow the user to set and refine preferences through usage of the media guidance application 105.

Based on determining that the event is relevant to the user, the media guidance application 105 may further determine whether additional information about the event, including the communications received from the user's social connections, suggests that a media guidance application 105 should present a notification to the user despite the media guidance application 105 being in a do not disturb mode. As used herein, a social connection is a connection between two individuals based on the user's social media memberships. For example, a user may join a social group which can be depicted as a directed graph wherein each user in the social group is a node with connections to other nodes. A social connection can be represented by a combination of N-Level connections between nodes; where a first-level connection is a direct connection between two nodes, a second-level connection is a connection between two nodes with an intermediate node, and a third-level connection is a connection between two nodes with two intermediate nodes. A social group may be defined based on the user being a root node with and only the user's first-level connections or may be defined as a collection of the user's connections expanding beyond the first-level connections based on traits of the connections, e.g., following connections based on an affinity for specific sports, shows, movies, books, etc. The media guidance application 105 may receive several electronic communications that are all related to the event. Based on the frequency and/or volume of the communications, the media guidance application 105 may determine that a notification should be presented. For example, the user may belong to several social groups and configure different thresholds to be used by the media guidance application 105 for when an event, as related to each social group, should supersede a do not disturb mode. The media guidance application 105 may, in some embodiments, provide a user interface screen for configuring these threshold as depicted in FIG. 2.

In some embodiments, the media guidance application 105 may determine whether additional information about the event, including the communications received from the user's social connections, suggests that a media guidance application 105 should present a notification to the user despite the media guidance application 105 being in a do not disturb mode based on whether the event is trending, e.g. when a threshold of electronic communications within a social network are exchanged within a particular time period about the event, among a plurality of users associated with the user. For example, the media guidance application 105 may analyze the user's social groups and messages sent from various social connections of the user. Using the analysis, the media guidance application 105 may determine that a quantity of messages about the gold medal match had been sent in a specific period indicating that gold medal match is trending. The media guidance application 105 may, based on determining that the event is trending among the plurality of users associated with the user, display a notification about the event to the user while the media guidance application 105 is in the do not disturb mode.

Figure 2:
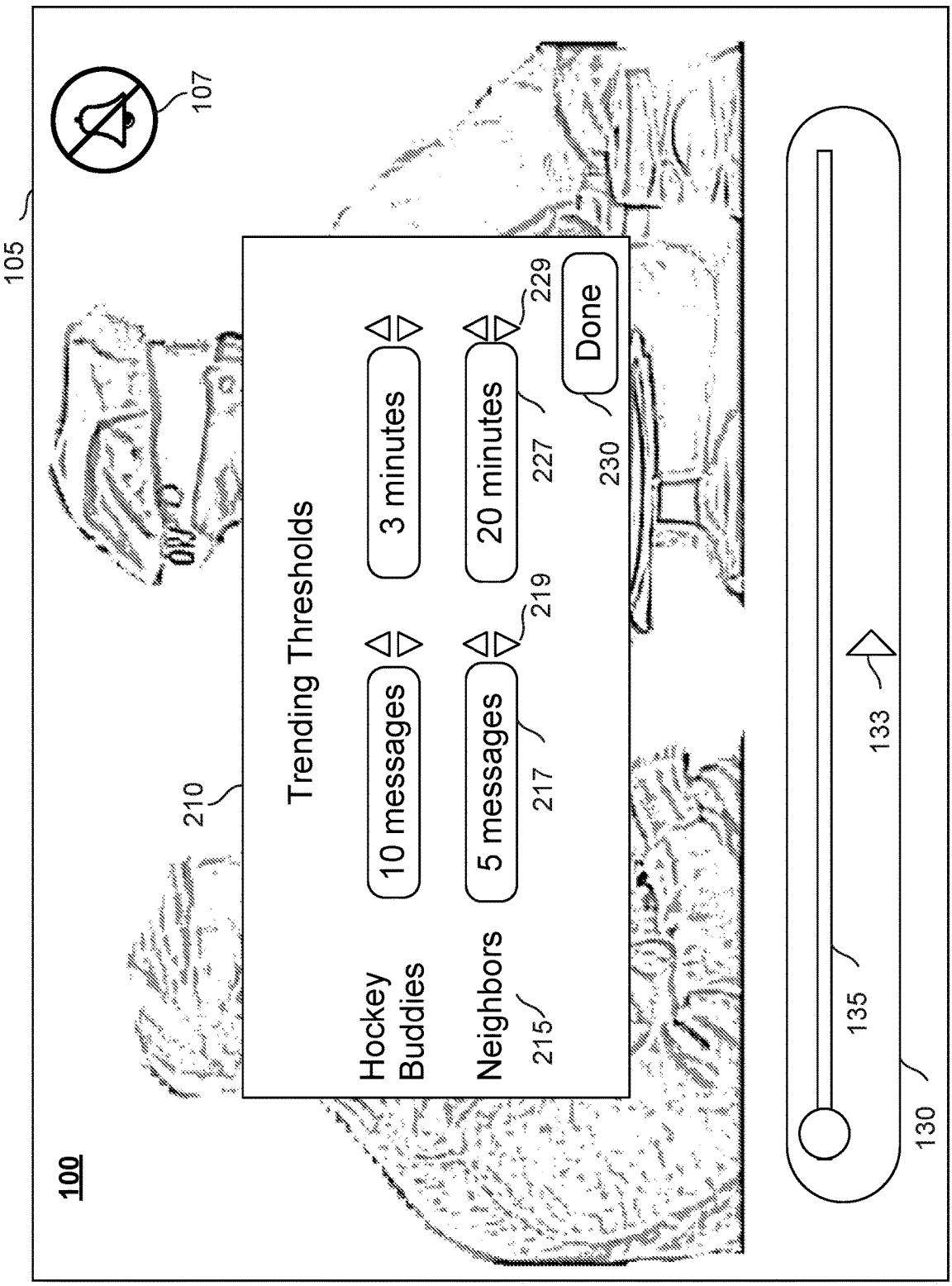
FIG. 2 depicts an illustrative embodiment of a display screen that may be used to manage configuration settings for when to display a notification on a device that is in mode that prevents presentation of notifications in accordance with some embodiments of the disclosure.

FIG. 2 depicts an illustrative embodiment of a display screen that may be used to manage configuration settings for when to display a notification on a device that is in mode that prevents presentation of notifications in accordance with some embodiments of the disclosure. In FIG. 2, the media guidance application 105 generates a configuration interface 210 that provides a user with interface elements for configuring thresholds for when the media guidance application 105 should consider an event trending for the purpose of superseding a do not disturb mode. In FIG. 2, the interface is depicted with two social groups "Hockey Buddies" and "Neighbors" and respective settings. For example, next to the social group label 215 is a message number setting 217 along with adjustment elements 219. In the row of the interface, the configuration interface 210 contains a time interval setting 227 along with adjustment elements 229. The configuration interface 210 also contains a user interface element 230 for notifying the media guidance application 105 that the user is done with making changes to the notification settings. In FIG. 2, the exemplary threshold settings associated with "Hockey Buddies" have been set to "10 messages" and "3 minutes" while the threshold settings associate with "Neighbors" have been set to "5 messages" in "20 minutes." Based on these settings, the media guidance application 105 would consider an event related to the user's "Hockey Buddies" group as trending if the media guidance application 105 determines that the user has received 10 messages from members of the user's "Hockey Buddies" group within 3 minutes of one another while the media guidance application 105 would consider an event related to the user's "Neighbors" group trending in response to receiving 5 messages from members of the user's "Neighbors" group. In this way, the user has tailoring the requirements for notifications to supersede a do not disturb setting based not just on the user's preference for being or not being disturbed but also based on the user's desire to allow some groups to have a lower threshold for disturbing the user.

In some embodiments, the media guidance application 105 may determine whether the event is trending among a plurality of users that share membership in a social group as described above with the user according to the following process. The media guidance application 105 may identify the plurality of users that share membership in the social group with the user based on comparisons of the keyword with social group attributes of each of the plurality of users. For example, the user may belong to several social groups such as a group of connections that play a sport together, such as ice hockey, and social connections that live in the same geographic area, i.e., neighbors from a neighborhood and the extracted keyword, e.g., hockey, is related to the user's ice hockey social group. The media guidance application 105 may identify members of the hockey social group as the plurality of users that share membership in the social group related to the event. The media guidance application 105 may retrieve information about a plurality of communications that contain the keyword originating from the plurality of users. For example, the media guidance application 105 may capture the date, time, location and/or other metadata for messages from a user's ice hockey social group that contain the keyword hockey. The media guidance application 105 may determine whether a threshold number of the plurality of communications were sent within a predetermined time interval of one another. For example, the media guidance application 105 may determine that 10 messages containing the keyword hockey were sent within 3 minutes from a user's ice hockey social group. In some embodiments, the media guidance application 105 may retrieve configuration settings provided by the user from a datastore that sets the threshold number of communication and predetermined time interface from a datastore. In some embodiments, the media guidance application 105 may be hardcoded with the threshold number of communication and predetermined time interface. In some embodiments, configuration settings may be pushed by a remote server to the media guidance application 105. In some embodiments, the configuration settings may be periodically updated by a remote server.

In some embodiments, the media guidance application 105 may determine a level of importance of the event and adjust the threshold number of communications and predetermined time based on the importance of the event. For example, the level of importance represents a relative connection between the user and the event using a scale from 0.0 to 1.0, and the media guidance application 100 computes the level of importance using weights computed against the connections made between the keyword and the user's preferences, interactions, and history. If the media guidance application 105, for example, determines that an event has a higher level of importance, the media guidance application 105 may adjust the threshold and time so that fewer messages may be received in a longer time period to invoke the media guidance application 105 to supersede the do not disturb mode and display a notification. The level of importance of an event may be assigned to an event based on keywords in the information received about the event. For example, the media guidance application 105 may provide a user interface that allows the user to classify hockey events as high importance and classify, for example, bobsled events as lower priority. In some embodiments, the media guidance application 105 may infer the importance of an event based the quantity of user preference related to the event. For example, the media guidance application 105 may infer that hockey events are given a higher importance because the user has indicated a preference for hockey, ice hockey, multiple ice hockey teams, and multiple ice hockey athletes. In some embodiments, the media guidance application 105 may determine the importance of an event based on a history of monitored interactions. For example, the media guidance application may infer importance of an event based on the user's viewing habits of media assets related to the event. In some embodiments, the media guidance application may monitor the user's activities in response to receiving a past notification and user that information to adjust the importance of future events.

In some embodiments, the media guidance application 105 may determine a level of importance of the event based on the current activity of the user. For example, the media guidance application 105 may access a user's calendar to determine the user is currently at a business dinner or the media guidance application 105 may determine an active application, e.g., a movie streaming application. Based on the user's current activity, the media guidance application 105 may adjust the threshold and time so that fewer messages may be received in a longer time period to invoke the media guidance application 105 to supersede the do not disturb mode and display a notification. In some embodiments, the media guidance application 105 may infer activities based on a user's location. For example, the media guidance application 105 may access GPS information to determine the user is at a medical building and infer the user is in a doctor's meeting or determine the user is at a religious institution and infer the user is attending a religious ceremony. The media guidance application may then adjust requirements to breakthrough a do not disturb mode based on the user's current activity.

In some embodiments, the media guidance application 105 may determine a level of importance of the event based on the identities of the members of the user's social group that are sending communications. For example, the media guidance application 105 may inspect a social graph that depicts the user's social group to determine how the user is connected with the members of the user's social group that are sending communications, i.e., is the connected directly or by intermediate connections and weight the importance of each communication based on the user's level of connection to the originating user. The media guidance application 105 may then mathematically generate an importance calculation by averaging, summing, or some other statistically approximation, the various weights given to each communication to determine a level of importance of the event based on who is communicating about the event. Using this calculated importance, the media guidance application 105 may adjust the threshold and time so that fewer messages may be received in a longer time period to invoke the media guidance application 105 to supersede the do not disturb mode and display a notification or to require additional messages in a shorter period of time.

Returning to FIG. 1, in response to determining that the notification should be presented to the user despite the media guidance application 105 being in a do not disturb mode, the media guidance application 105 presents information about the events and/or received communications to the user. For example, the media guidance application 105 may present a pop-up message that includes text related to the event and/or communications received about the event such as notification 110 that includes a context icon and responsive user interface element 115. In some embodiments, the media guidance application 105 may access a central notification system through an application programming interface provided by an operating system of the device that implements media guidance application 105. In some embodiments, the media guidance application 105 may generate the notification 110 as an overlay on the current screen making use of the drawing functions available to the media guidance application 105. In some embodiments, the media guidance application 105 may notify the user of the event through an external notification system by, for example, directing a communication to a second device in use by, or associated with, the user. In some embodiments, the media guidance application 105 may present an audio notification along with or in lieu of a visual notification 110.

In some embodiments, the media guidance application 105 may determine whether the event is relevant to a user according to the following process. An event may be relevant to a user when the user's preferences, viewing history, and/or application interactions contain data that is connected to the event. For example, an event may be a stream of a sporting event, and the event may be relevant to a user because information about the user indicates they are interested in the event, for example the user's viewing history indicates that the user often watches that sport. The relevance of an event and a user may be determined because, for example, information about the event contains keywords that are logically, syntactically, or semantically with data about the user's preferences, viewing history, and/or application interactions. The media guidance application 105 may extract a keyword from the information about the event. For example, the media guidance application may extract a keyword from an short message service message using text mining techniques (e.g., named entity recognition, coreference, sentiment analysis, semantic analysis, etc.) to retrieve a pertinent keyword. In some embodiments, a communication may be accompanied by metadata or other information that provides event context indicators that classify the communication as being related to or relevant to specific events. In some embodiments, the communication may contain hashtags that provide user define context hints from which the media guidance application 105 may extract keywords pertinent to the event. The media guidance application 105 may also retrieve preferences of the user. For example, the media guidance application 105 may maintain a datastore with preferences a user has set for favorite sports, favorite teams, favorite athletes, favorite movie genre, or favorite actor. The media guidance application 105 compares the extracted keyword to the preferences of the user to determine, based on the comparison, whether the event is relevant to the user. For example, if the media guidance application 105 extracts the keyword "hockey" from the information about the event and compare the keyword hockey with the user's preferences for ice hockey as a favorite sport to determine that the event is relevant to the user.

In some embodiments, the media guidance application 105 may provide a user interface for receiving selections from the user of keywords to monitor while a device that implements the media guidance application 105 is in a do not disturb mode. For example, when a user issues a command to the device to enter the do not disturb mode, the media guidance application 105 may supplement the interface with a collection of keywords and a checkbox to monitor those keywords. In some embodiments, the media guidance application 105 may provide an interface that accepts text input to add new keywords to be monitored to when a device is in a do not disturb mode. In some embodiments, the media guidance application 105 analyzes information about the event to determine whether a user selected keyword is present in the information to make the determination of whether the event is relevant to the user while the device is in the do not disturb mode.

In some aspects of the disclosure, the media guidance application 105 may determine whether a notification should supersede a mode of operation that prevents presentation of information about events based on applications in use by members of the user's social groups. For example, the media guidance application 105 may determine whether additional information about the event, including the communications received from the user's social connections, suggests that a media guidance application 105 should present a notification to the user despite the media guidance application 105 being in a do not disturb mode based on whether a threshold number of users among a plurality of users that share membership in a social group with the user are accessing an application associated with the event. The media guidance application 105 may access information with associated communications received from a user's social connections and determine that many of the user's social connections sent communications while using a media player to stream the gold medal match. This information may, for example, contain metadata or other data that indicates the application is in use by senders of various communications. For example, the text of communication may contain an application identifier such as the name of an application, a hashtag for the application, or a nickname for the application. The communication may be accompanied by metadata that indicates an associated application. In some embodiments the threshold number of connections may be a percentage of the user's social connections, e.g., 20%, while in some embodiments it maybe a set number, e.g. 15 social connections. Based on determining that the threshold number of users among the plurality of users that share membership in the social group with the user are accessing applications associated with the event, displaying, while the media guidance application 105 is in the do not disturb mode, a notification about the event to the user on the media guidance application 105 as described above. In some embodiments, the media guidance application 105 may query a remote server for information about the about applications in use by the plurality of users. In some embodiments, the media guidance application 105 may send a message to the plurality of users to request information about the applications in use by the plurality of users.

In some embodiments, the media guidance application 105 provides options to a user for how the media guidance application 105 will override the mode of operation. The media guidance application 105 generates for display on a user equipment device an option that indicates modifications to the mode of operation that prevents presentation of information about events. For example, the media guidance application 105 may present user interface elements including an option to display notifications related to events for the user's ice hockey social group, an option to display notifications related to events for the user's ice hockey social group for a limited time window, and an option not to display notifications related to events for the user's ice hockey social group.

Figure 3:
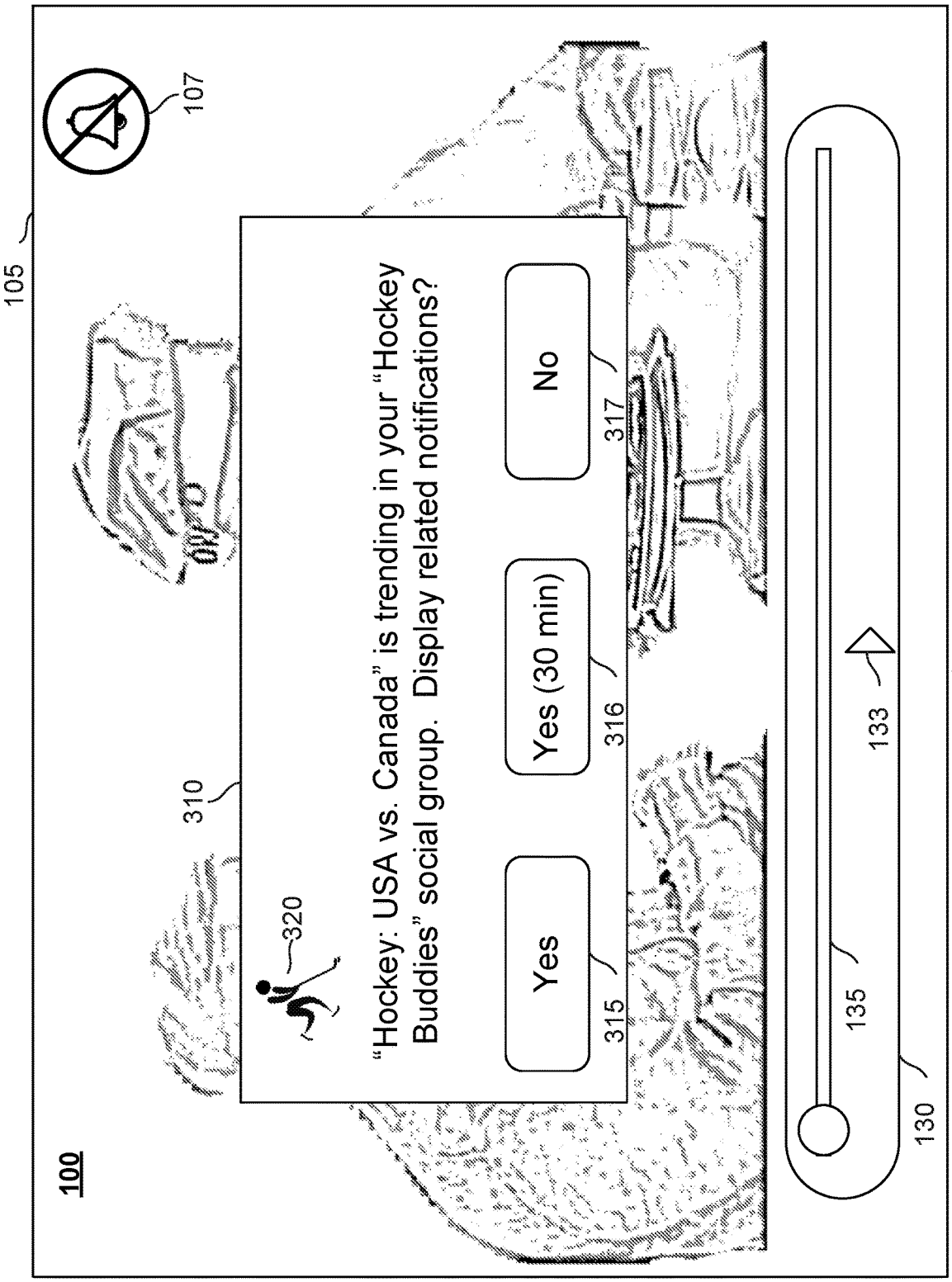
FIG. 3 depicts an illustrative embodiment of a display screen that may be used to display a notification on a device that is in mode that prevents presentation of notifications in accordance with some embodiments of the disclosure.

FIG. 3 depicts an illustrative embodiment of a display screen that may be used to display a notification on a device that is in mode that prevents presentation of notifications in accordance with some embodiments of the disclosure. In FIG. 3, the media guidance application 105 had determined that a notification related to an event may supersede a do not disturb mode and has presented an exemplary notification options interface 310 over the player screen 105. The notification options interface 310 depicts a context icon 320 along with a textual description of a pending notification. In the notification options interface 310, provides a prompt for whether the user desires for the media guidance application 105 to display event notifications related to the gold medal match for Woman's Ice Hockey between Team USA and Team Canada. The media guidance application 105 has presented exemplary options of: a "Yes" option 315, a "Yes (30 min)" option 316, and a "No" option 317.

The media guidance application 105 receives a selection of an option from the user. For example, the media guidance application 105 receives taps or clicks on the user interface elements. In response to receiving the selection of the option, the media guidance application 105 modifies the mode of operation to allow information about the event to be presented to the user. In response to the "Yes" option 315, the media guidance application 105 may present notifications of the event, such as notification 110, in accordance with prior descriptions. For example, the media guidance application 105 may have a pending notification which is displayed, such as notification 110, and furthermore additional communications from users related to the determined event will also supersede the do not disturb mode without impacting whether notifications for other events will supersede the do not disturb mode. In response to the "Yes (30 min)" option 316, media guidance application 105 may continue displaying notifications related to the determined event for a limited time period, e.g., the next 30 minutes. After the time period expires, the media guidance application 105 may revert to treating notifications related to the event in accordance with techniques described herein so that the event must be determined by the media guidance application to be trending within a user's social group in order to supersede the do not disturb mode. In response to the "No" option 317, the media guidance application 105 may determine to cancel the display of a pending notification and/or may determine that additional notifications related to the determined event should not supersede the do not disturb mode but should, instead, be treated in accordance with the techniques described above by determining whether the event is trending when additional information about the event is received.

In some embodiments, the media guidance application 105 provides an interface to allow a user to cancel a notification after the media guidance application 105 determines to display the notification despite being in a mode of operation that prevents notifications from being displayed. For example, in FIG. 3, the "No" option 317 may—along with or in lieu of cancelling additional notifications—further cancel the current notification. In some embodiments, the media guidance application 105 may generate, for presentation on the device, an icon that indicates a notification is available. For example, the media guidance application 105 may display an icon that indicates a notification is available, e.g., an icon of an ice hockey player to indicated that notification is available for the gold medal match for Woman's Ice Hockey between Team USA and Team Canada. This may be presented in an inconspicuous manner in a corner of a display device for a short amount of time. The media guidance application 105 may then receive, from the user, a user interface gesture. For example, the user may click an appropriate button or swipe an appropriate direction to indicate either the user would like to view the notification or would like to cancel the notification. The media guidance application 105 may determine whether the user interface gesture indicates the notification should be cancelled. For example, the user may click an 'X' icon, a "Cancel" or "No" button, such as option 317, or swipe in a direction configured to indicate the notification should be cancelled. The media guidance application 105 may, in response to determining that the user interface gesture indicates the notification should be cancelled, cancel additional notifications related to events trending within the social group. For example, the media guidance application 105 may track the cancellation and use that information to prevent another related notification in the future.

In some embodiments, the media guidance application 105 cancels additional notifications related to events trending within the social group according to the following process. The media guidance application 105 stores an indication of the cancellation of the notification in association with the social group. For example, the media guidance application 105 may store an indication that notifications for events related to the user's ice hockey social group should not supersede the current do not disturb mode. In response to receiving information about a second event that is determined to be trending within the social group, the media guidance application 105 maintains the mode of operation that prevents presentation of information about events. For example, the media guidance application 105 may receive information related to a men's ice hockey game while the device is in the do not disturb mode and determine that information was stored indicating that notifications for events related to the user's ice hockey social group should not supersede the current do not disturb mode. Thus, the media guidance application 105 may receive information about a second event, or a second notification regarding the event, that indicates communications are trending in the user's social group, but because the user previously cancelled a notification, the media guidance application 105 may not issue a notification for the trending event. The media guidance application 105 may provide a mechanism to reset the cancellation after a designated time period, e.g., after 30 minutes, or reset the cancellation upon the next entry into a do not disturb mode.

In some embodiments, the media guidance application 105 may present notifications to the user in a manner that provides the user with context for notification. For example, notification 110 of FIG. 1 and notification options interface 310 each contain a context icon 120 and 320 respectively. The media guidance application 105 may determine a context of the event based on the keyword extracted from the information about the event. For example, the media guidance application 105 may analyze the hockey keyword and determine that the event is related to sports or, more particularly, to ice hockey. The media guidance application 105 may retrieve a plurality of icons. For example, the media guidance application 105 may maintain, or remotely access, a datastore containing notification icons for different contexts including an email envelope, an image of a calendar, and an image of an ice hockey player. The media guidance application 105 may identify a context icon 120 from the plurality of icons based on the determined context of the event. For example, using a lookup table or other metadata to cross-reference the available items with the identified context. The media guidance application 105 may generate, for presentation on the device, the context icon 120 along with the notification 110. For example, when generating a notification about the gold medal ice hockey game, the media guidance application 105 may include an icon of an ice hockey player to represent the context of the notification. In another example, the media guidance application 105 may determine that a notification related to a trending news item may be presented with a context icon of a newspaper. In some embodiments, the media guidance application 105 may present a user interface screen that allows the user to assign context icons to keywords. In some embodiments, the media guidance application 105 may present a curated list of icons for assignment to keywords. In some embodiments, the media guidance application 105 may provide an input mechanism for a user to upload and/or specify a remote location where the media guidance application 105 may locate the desired context icon.

In some embodiments, the media guidance application 105 may further select a context icon based on a priority level for notification. For example, a notification for an event that is trending more popularly may be displayed in a color commensurate with the determined popularity. The media guidance application 105 may determine a priority level for the notification based on the number of the plurality of communications and a time interval between the origination of a first of the plurality of communications and a last of the plurality of communications. For example, the media guidance application 105 may determine that several communications regarding the event in question were received in a short time period which indicates the notification should be given a high priority level; the priority level may be configured to be high based on receiving, for example, 6 messages in 2 minutes. In some embodiments, the media guidance application 105 maintains configurable settings that indicate priority levels of events, for example based on keywords. For example, table 1 below provides various thresholds for indicating that events in different contexts have a low, medium, or high priority.

TABLE 1

Context Priority Levels

| Keyword | Priority Level | Message Count | Time Period |
|---|---|---|---|
| hockey | Low | 5 | 30 minutes |
| hockey | Medium | 10 | 15 minutes |
| hockey | High | 6 | 2 minutes |
| neighborhood | Low | 2 | 30 minutes |
| neighborhood | Medium | 3 | 20 minutes |
| neighborhood | High | 4 | 20 minutes |

The media guidance application 105 may identify a set of icons from the plurality of icons, including the context icon, based on the determined context. For example, the media guidance application 105 may identify several potential icons of an ice hockey player, based on the keyword, but each icon being in a different color such as green, yellow, and red. The media guidance application 105 may identify attributes associated with each icon of the set of icons. For example, the media guidance application 105 may identify an attribute of high priority for the red icon of hockey player, an attribute of medium priority for the yellow icon of hockey player, and an attribute of low priority for the green icon of hockey player. In some embodiments, the icons may be named to include a description of the priority, for example "ice_hockey-low.png", "ice_hockey-medium.png" and "ice_hockey-high.png." In some embodiments, a datastore may contain a listing of icons along with designations of which icon to use for which priority levels. The media guidance application 105 may compare the determined priority level with the attributes associated with each icon of the set of icons and select the context icon from the set of icons based on the comparison of the determined priority level with the attributes associated with each icon of the set of icons. For example, if the media guidance application 105 determines the priority level of the notification is a high priority, then the media guidance application 105 may select the red icon from the set of icons based on the attributes of the icons indicating the red icon of the hockey player is for a high priority context.

In some embodiments, the media guidance application 105 further generates notifications to include the content of a communication that was received from one of the plurality of users that share membership in the social group with the user. The media guidance application 105 may identify a primary source from the plurality of users based on the number of first-level social connections the primary source has to other users of the plurality of users. For example, the media guidance application 105 may inspect a social graph of the user's ice hockey social group to find a user with the most social connections within the group, i.e., a primary source or influencer. In some embodiments, the media guidance application 105 may identify a member of the user's social media group that has a large number of social connections outside of the connections to other members of the user's social group. For example, the social group may contain a celebrity or star athlete that is followed by a large number of other users. When presenting the notification to the user, the media guidance application 105 may infer the user would want to see a relevant communication from the influencer. In some embodiments, the media guidance application 105 may identify a communication from the plurality of communications that originated from the primary source. For example, the media guidance application 105 may locate a social message, e.g., a tweet, that came from the influencer or a text message that originated from the primary source. The media guidance application 105 may then generate the notification to contain contents of the communication that originated from the primary source. For example, the media guidance application 105 may use the specific contents or a portion of the contents of the influencer's communication for text within the notification.

In some embodiments, the media guidance application 105 may further employ configuration settings related to social groups to determine whether notifications for a social group supersede a mode of operation that prevents notifications from being displayed. The media guidance application 105 may generate, for presentation on the device, a configuration interface comprising interface elements for receiving configuration settings indicating a plurality of social groups to which the user is a member and whether trending events from each of the plurality of social groups can override the mode of operation that prevents presentation of information about events. For example, the media guidance application 105 may present a list of social groups along with a check box, or other selection element, for selecting whether notifications for that social group can supersede a do not disturb mode. The media guidance application 105 may receive, by user interactions with the configuration interface, the configuration settings and storing the configuration settings in a datastore. The media guidance application 105 may, when overriding the mode of operation that prevents presentation of information about events further comprises, determine whether events trending in the social group of the plurality of the users are configured, based on the configuration settings, to override the mode of operation that prevents presentation of information about events. For example, when the media guidance application 105 determines whether to override the mode of operation, the media guidance application 105 may check whether the notifications for the associated social group are allowed to break through do not disturb mode.

In some embodiments, the media guidance application 105 may further respond to determining that the threshold number of users among the plurality of users that share membership in a social group with the user are accessing applications associated with the event, by activating an application according to the following process. The media guidance application 105 may identify an application context based on the information of about the event. For example, the media guidance application 105 may identify that people are watching the gold medal match for Woman's Ice Hockey between Team USA and Team Canada and that an application context is identified for watching that event. The media guidance application 105 may then identify an application associated with the event that is available to the user on the device. For example, the media guidance application 105 may identify a video stream application capable of streaming the gold medal match for Woman's Ice Hockey between Team USA and Team Canada. The media guidance application 105 may generate, for presentation, a user interface element to activate the application. For example, the media guidance application 105 may present a confirmation screen before activating a streaming application. In response to receiving user interaction with the user interface element, the media guidance application 105 activates the associated application with the identified application context.

Used herein, "application context" refers to information and/or settings that an application may use or receive to indicate a state of the application upon activation. For example, an application context may indicate a media asset stream for the application to open for display to the user. Alternatively, an application context may indicate a message thread for an application to open for the user to participate in a social network exchange. Still another example of an application context may indicate a size and position of a window in which an application is displayed. Another application context may indicate a time period for which the application should remain active before closing.

In some embodiments, the media guidance application 105 identifies the application associated with the event that is available to the user on the device according to the following process. The media guidance application 105 retrieves plurality of indicators of applications capable of providing functions related to the identified application context. For example, the media guidance application 105 may access a datastore that indicates several applications are capable of serving video content including the gold medal match for Woman's Ice Hockey between Team USA and Team Canada. The media guidance application 105 determines that a plurality of applications identified in the plurality of indicators of applications are available for use on the device. For example, the media guidance application 105 may access configuration information, or a datastore, that maintains information about applications available to the media guidance application 105, or otherwise installed on the user equipment device that implements the media guidance application 105. The media guidance application 105 compares attributes of the plurality of applications available for use on the device with the preferences of the user. For example, the media guidance application 105 may identify several applications available for streaming video content and determine that the user prefers one or more applications. The media guidance application 105 selects the application associated with the event that is available to the user on the device based on the comparison of attributes of the plurality of applications available for use on the device with the preferences of the user.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance application may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
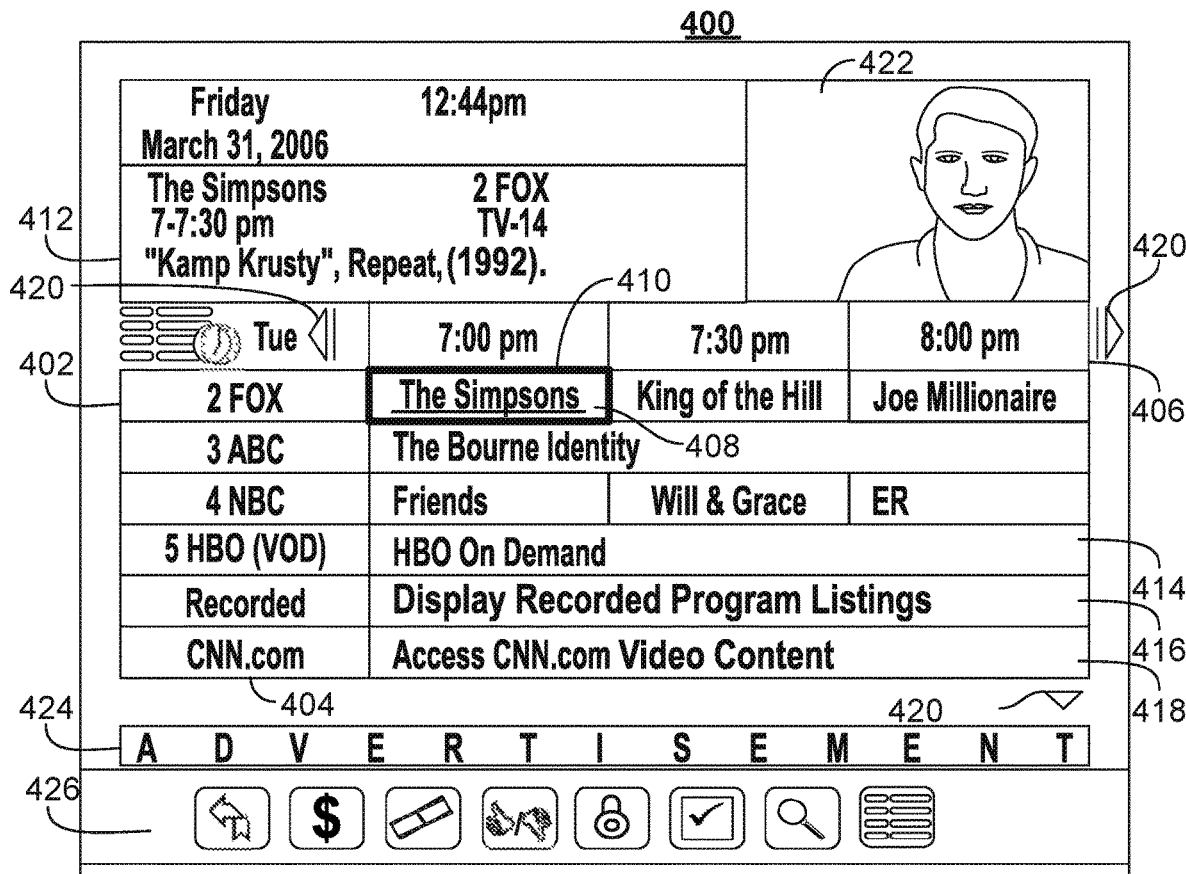
FIG. 4 shows an illustrative embodiment of a display screen that may be used to provide media guidance application listings and other media guidance information, in accordance with some embodiments of the disclosure.
Figure 5:
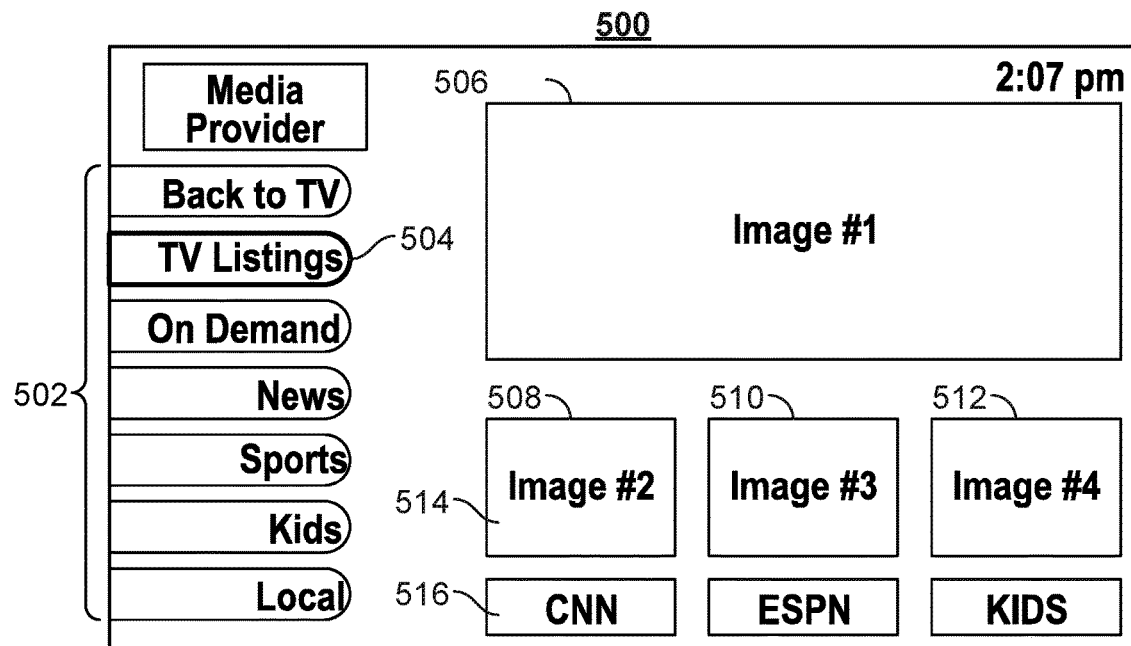
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
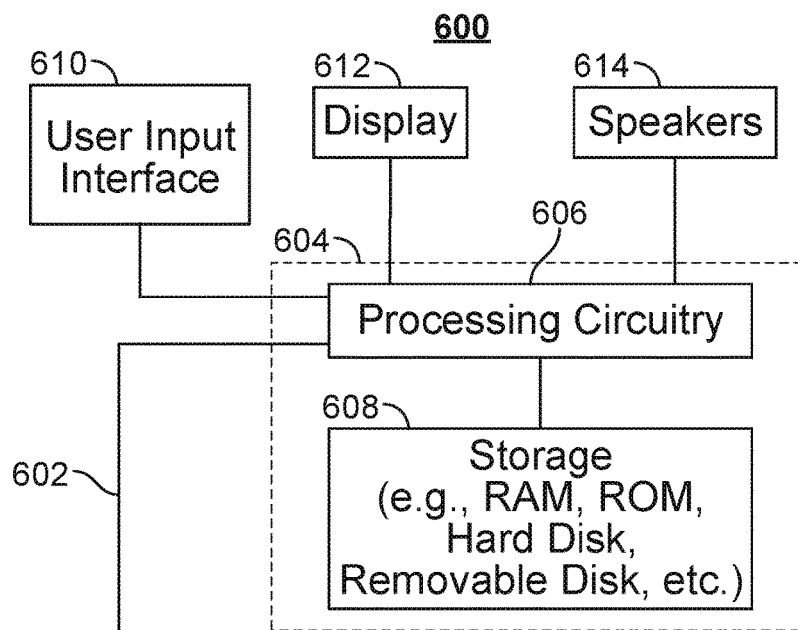
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
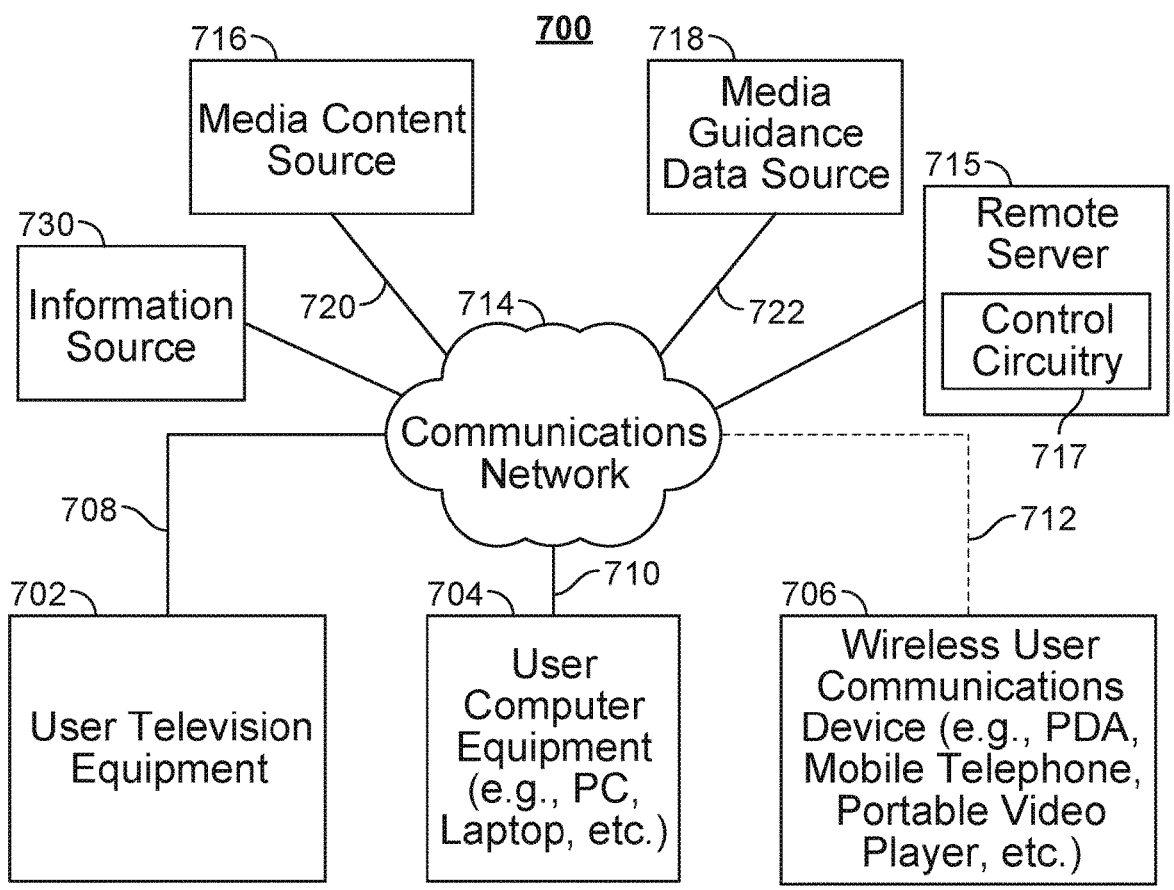
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance application may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based on applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
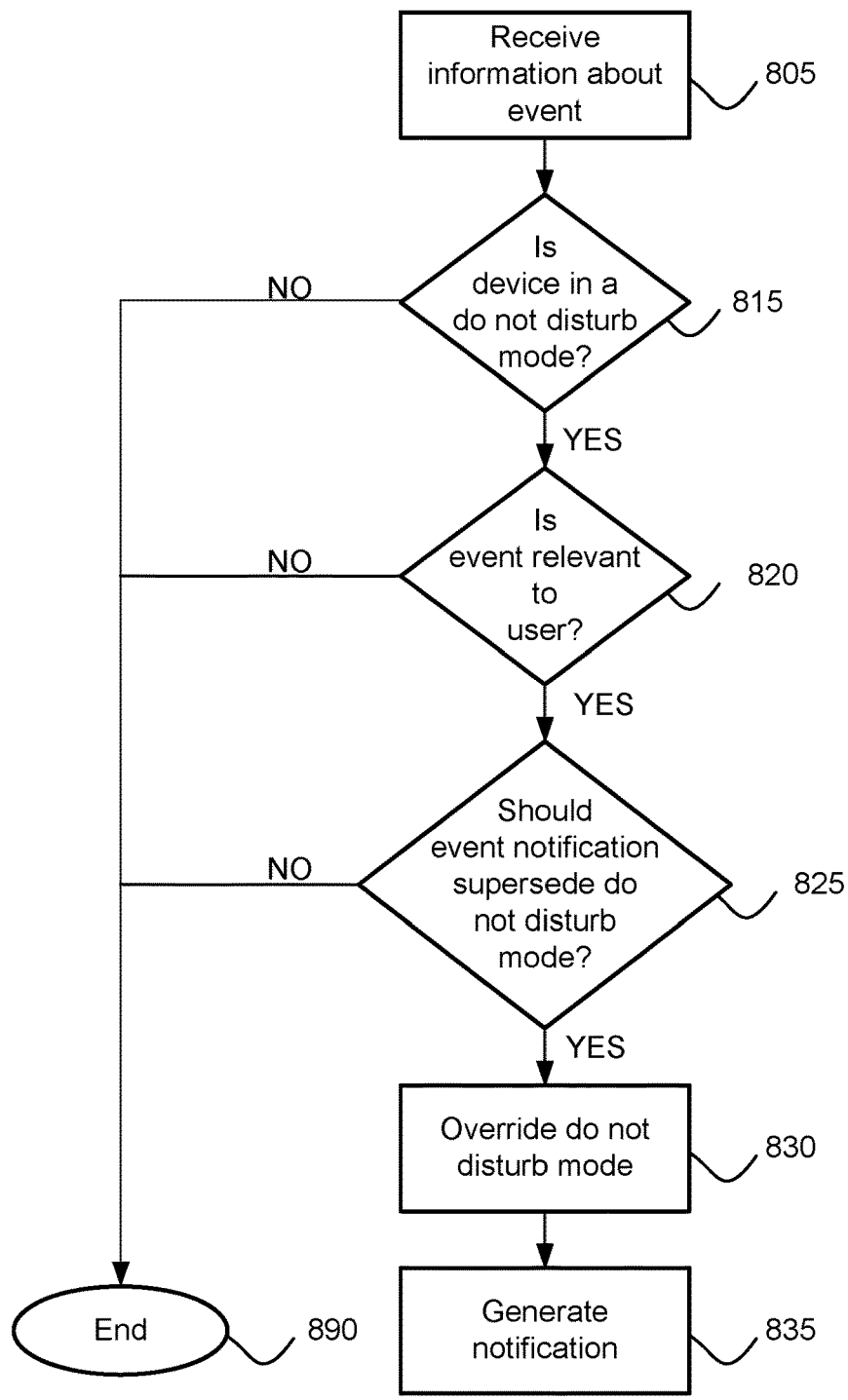
FIG. 8 depicts an illustrative flowchart of a process for generating for presentation information about an event on a device that is in a mode of operation that prevents presentation of information about events in accordance with some embodiments of the disclosure.

FIG. 8 depicts an illustrative flowchart of a process for generating for presentation information about an event on a device that is in a mode of operation that prevents presentation of information about events in accordance with some embodiments of the disclosure. Process 800 may be executed by control circuitry 604 (e.g., in a manner instructed to control circuitry 604 by the media guidance application). Control circuitry 604 may be part of user equipment (e.g., a user equipment generating media guidance application 105, which may have any or all of the functionality of user television equipment 702, user computer equipment 704, and/or wireless communications device 706), or of a remote server separated from the user equipment by way of communication network 714, or distributed over a combination of both.

Process 800 begins at 805, where control circuitry 604, using a media guidance application 105, receives, on a user equipment 100, information about an event via I/O path 602. For example, the control circuitry 604 may receive, from other users in a user's social group, electronic communications containing information about the gold medal match for Woman's Ice Hockey between Team USA and Team Canada. In response to receiving the information about the event, process 800 continues at 815 where control circuitry 604 determines whether the media guidance application 105 is configured to be in a mode of operation that prevents presentation of information about events, e.g., a do not disturb mode. In some embodiments, presentation of information about events is disabled by disabling visual display, e.g., on a display 612, and/or disabling audio presentation, e.g. on speakers 614. For example, the control circuitry 604 may inspect configuration settings of the media guidance application 105 from storage 608 to determine whether media guidance application 105 has been configured, or placed, in do not disturb mode. In response to determining media guidance application 105 is not in a mode of operation that prevents presentation of information about events, process 800 concludes at step 890.

In response to determining that the media guidance application 105 is configured to be in a mode of operation that prevents presentation of information about events, the control circuitry 604 determines whether the event is relevant to a user at step 820. Based on the user's preferences, e.g. as stored in storage 608, the user equipment 100 may determine that hockey is relevant to the user's interests. For example, the media guidance application 105 may receive information about an ice hockey event that the media guidance application 105 determines is relevant to the user based on the user's preferences for watching winter sports or based on other preferences as described further. In response to determining that the event is not relevant to the user, the control circuitry 604 may conclude process 800 at step 890.

In response to determining that the event is relevant to the user, process 800 may continue at 825 by determining whether a notification about the event should supersede the mode of operation that prevents presentation of information about events. For example, the control circuitry 604 may access a user's social media feeds via I/O path 602 and determine that messages about the gold medal match for Woman's Ice Hockey between Team USA and Team Canada are trending based on the number of messages sent related to the event and the time period during which the messages were sent. Based on the trending of the event, the control circuitry 604 may determine that the user would have a preference for a notification about the event to be presented by display 612 or speakers 614 even though the media guidance application 105 is in a do not disturb mode. In response to determining that a notification about the event should not supersede the mode of operation that prevents presentation of information about events, process 800 concludes at step 890.

In response to determining that a notification about the event should supersede the mode of operation that prevents presentation of information about events, process 800 continues at step 830 where the control circuitry 604 overrides the mode of operation that prevents presentation of information about events. For example, the control circuitry 604 may disable the do not disturb mode or modify the mode to allow for notifications specific to the event.

Process 800 continues at step 835, where control circuitry 604 generates, for presentation on the device, a notification containing information about the event. For example, the control circuitry 604 may display a pop-up message such as notification 110 in FIG. 1 on a display 612 or may play audio related to the event in speaker 614. In some embodiments, the notification may include text from a message about the event, for example showing a notification with a communication received from one of the members of the user's social group via I/O path 602.

Figure 9:
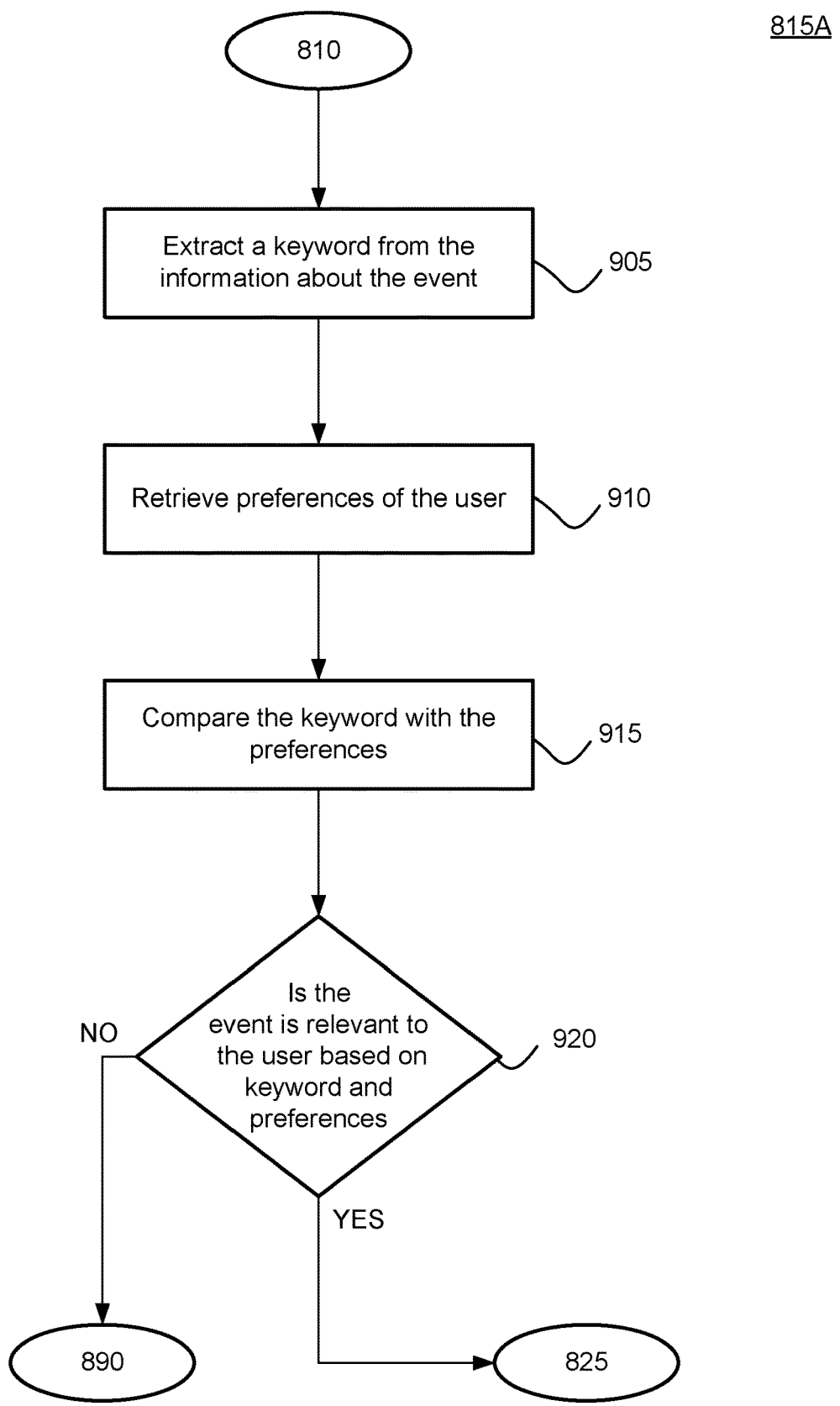
FIG. 9 depicts an illustrative flowchart of a process for determining whether an event is relevant to a user in accordance with some embodiments of the disclosure.

FIG. 9 depicts an illustrative flowchart of a process for determining whether an event is relevant to a user in accordance with some embodiments of the disclosure. Process 815A further depicts a method for determining whether an event is relevant to a user, for example expanding from step 815 from FIG. 8. Process 815A begins at 905 where control circuitry 604 extracts a keyword from the information about the event. For example, the control circuitry 604 may extract a keyword from a short message service message using text mining techniques (e.g., named entity recognition, coreference, sentiment analysis, semantic analysis, etc.) to retrieve a pertinent keyword. At step 910, process 815A may retrieve preferences of the user. For example, the control circuitry 604 may maintain preferences in storage 608 that a user has set for favorite sports, favorite teams, favorite athletes, favorite movie genre, or favorite actor and retrieve those preferences from the datastore. At step 915, the control circuitry 604 compares the keyword with the preferences. For example, the control circuitry 604 may perform a text matching comparison against the preferences to determine whether the preferences contain the keyword. In some embodiments, the control circuitry 604 may utilize natural language processing methods to make a logical comparison based on conceptual similarity to compare the preferences with a keyword. For example, control circuitry 604 may perform semantic similarity analysis between the preferences and the keyword.

At step 920, process 815A continues where control circuitry 604 determines, based on comparing the keyword with the preferences, whether the event is relevant to the user. For example, if the control circuitry 604 extracts the keyword "hockey" from the information about the event and compares the keyword hockey with the user's preferences for ice hockey as a favorite sport to determine that the event is relevant to the user. If control circuitry 604 determines that an event is relevant to the user, process 815A continues at step 820 as described in FIG. 8. If control circuitry 604 determines that an event is not relevant to the user, process 815A continues at step 890 as described in FIG. 8.

Figure 10:
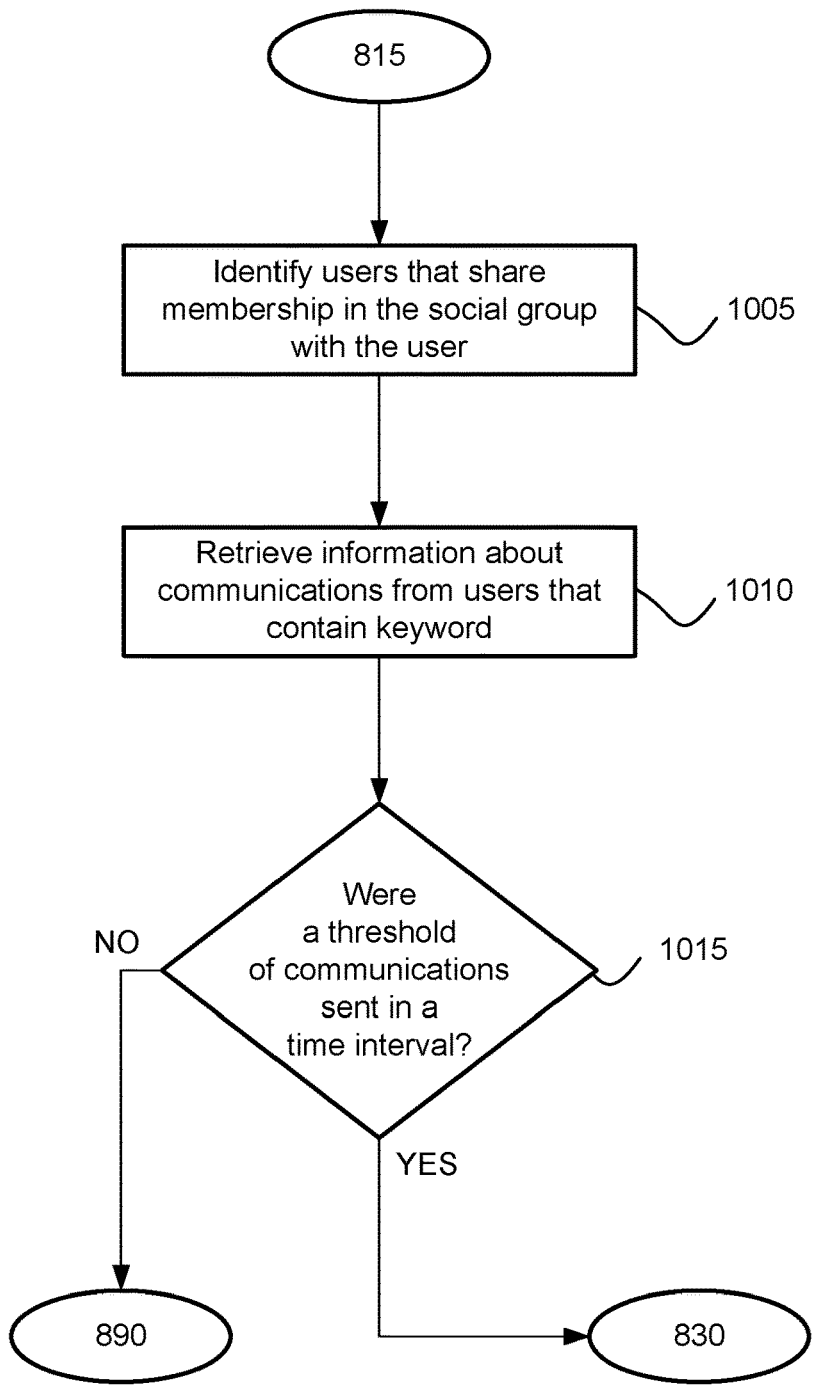
FIG. 10 depicts an illustrative flowchart of a process for determining whether an event notification should supersede a mode of operation that prevents presentation of information about events in accordance with some embodiments of the disclosure.

FIG. 10 depicts an illustrative flowchart of a process for determining whether an event notification should supersede a mode of operation that prevents presentation of information about events in accordance with some embodiments of the disclosure. Process 820A further depicts a method for determining whether an event notification should supersede a mode of operation that prevents presentation of information about events, for example expanding from step 820 from FIG. 8. Process 820A begins at step 1005, where control circuitry 604 identifies the plurality of users that share membership in the social group with the user based on comparisons of the keyword with social group attributes of each of the plurality of users. The control circuitry 604 may identify the plurality of users that share membership in the social group with the user based on comparisons of the keyword with social group attributes of each of the plurality of users. For example, the user may belong to several social groups such as a group of connections that play a sport together, such as ice hockey, and social connections that live in the same geographic area, i.e., neighbors from a neighborhood and the extracted keyword, e.g., hockey, is related to the user's ice hockey social group. The control circuitry 604 may identify members of the hockey social group as the plurality of users that share membership in the social group related to the event.

At step 1010, the control circuitry 604 continues by retrieving information about a plurality of communications that contain the keyword originating from the plurality of users. For example, the control circuitry 604 may capture the date, time, location and/or other metadata for messages received via I/O path 602 from a user's ice hockey social group that contain the keyword hockey.

Process 820A continues at step 1015, where control circuitry 604 determines whether a threshold number of the plurality of communications were sent within a predetermined time interval of one another. For example, the media guidance application may determine that 10 messages containing the keyword hockey were sent within 3 minutes from a user's ice hockey social group. In response to determining a threshold number of the plurality of communications were not sent within a predetermined time interval of one another, control circuitry 604 continues process 820A by concluding at step 890 as described in FIG. 8. In response to determining a threshold number of the plurality of communications were sent within a predetermined time interval of one another, control circuitry 604 continues process 820A by continuing to step 830 as described in FIG. 8.

Figure 11:
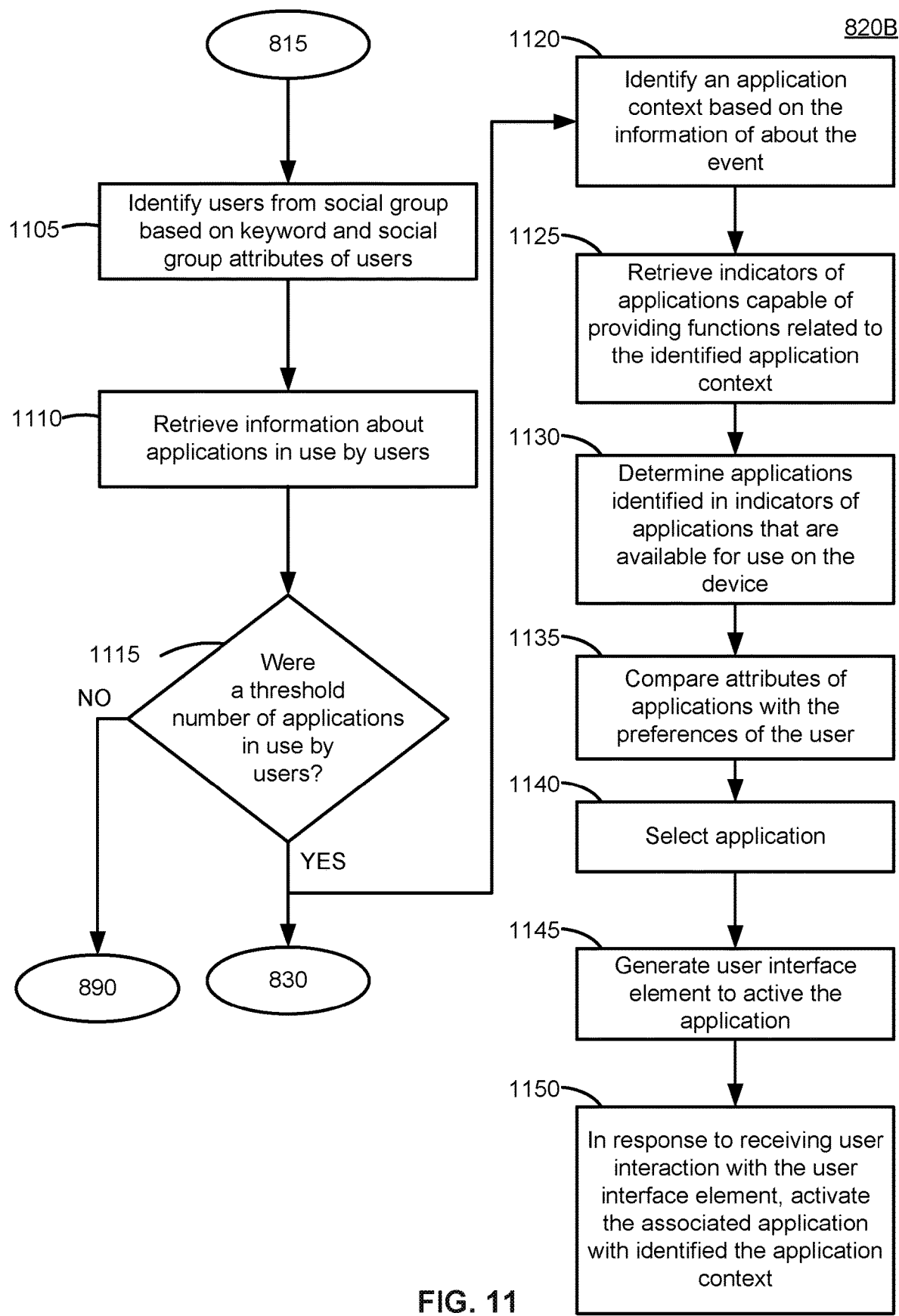
FIG. 11 depicts another illustrative flowchart of a process for determining whether an event notification should supersede a mode of operation that prevents presentation of information about events in accordance with some embodiments of the disclosure.

FIG. 11 depicts an illustrative flowchart of a process for determining whether an event notification should supersede a mode of operation that prevents presentation of information about events in accordance with some embodiments of the disclosure. Process 820B further depicts a method for determining whether an event notification should supersede a mode of operation that prevents presentation of information about events, for example expanding from step 820 from FIG. 8. Process 820B begins at step 1105, where control circuitry 604 identifies the plurality of users that share membership in the social group with the user based on comparisons of the keyword with social group attributes of each of the plurality of users in a manner similar as described with reference to step 1005 of FIG. 10.

At step 1110, process 820B continues by retrieving information about applications in use by the plurality of users. For example, the control circuitry 604 may analyze information from the communications received via I/O path 602 to determine that the user may have several social media connections using an application to stream the gold medal match for Woman's Ice Hockey between Team USA and Team Canada. In some embodiments, control circuitry 604 may request application usage information from a remote server to make a determination regarding applications in use by members of a social group. In some embodiments, control circuitry 604 may inspect metadata or other information in the communications of members of the social group to infer the applications in use by the members. For example, if the communications are in a specific format or contain specific characters heavily used when in a certain application, the control circuitry 604 may infer the corresponding application. At step 1115, the control circuitry 604 continues process 820B by determining whether a threshold number of applications in use by the plurality of users are associated with the event. If the control circuitry 604 determines that a threshold number of applications is not in use by the plurality of users associated with the event, then process 820B concludes at step 890 as described with reference to FIG. 8. If the control circuitry 604 determines that a threshold number of applications is in use by the plurality of users are associated with the event, then process 820B continues at step 830 as described with reference to FIG. 8.

In some embodiments, in response to determining that a threshold number of applications is in use by the plurality of users are associated with the event, process 820B also continues at step 1120 in order to activate a related application on the user equipment device 600. At step 1120, control circuitry 604 identifies an application context based on the information about the event. For example, the media guidance application may identify that people are watching the gold medal match for Woman's Ice Hockey between Team USA and Team Canada and that an application context is identified for watching that event. The application context may include a uniform resource location, channel number or name, or other media identifier sufficient to allow an application to access a stream of the gold medal match. Further, the application context may identify a capability associated with the resource, for example recording and/or streaming a media asset. The application context may further identify a particular application to be activated or suggest a plurality of applications that could be activated to service the application context. Process 820B continues by having control circuitry 604 identify an application associated with the event that is available to the user on the device and activating the application on the user equipment 100.

In some embodiments, process 820B continues at 1125 where control circuitry 604 retrieves a plurality of indicators of applications capable of providing functions related to the identified application context. For example, the control circuitry 604 may access a datastore that indicates several applications are capable of serving video content including the gold medal match for Woman's Ice Hockey between Team USA and Team Canada. At step 1130, control circuitry 604 continues process 820B by determining that a plurality of applications identified in the plurality of indicators of applications are available for use on the device. For example, the control circuitry 604 may access configuration information, or a datastore, that maintains information about applications available to the control circuitry 604, or otherwise installed on the user equipment 100 that implements the media guidance application 105. At step 1135, control circuitry 604 continues process 820B by comparing attributes of the plurality of applications available for use on the device with the preferences of the user. For example, the media guidance application may identify several applications available for streaming video content and determine that the user prefers one or more applications on user equipment 100. At step 1140, control circuitry 604 continues process 820B by selecting the application associated with the event that is available to the user on the user equipment 100 based on the comparison of attributes of the plurality of applications available for use on the user equipment 100 with the preferences of the user.

In some embodiments, process 820B continues at step 1145, where control circuitry 604 generates, for presentation, a user interface element to activate the application. For example, the control circuitry 604 may present a confirmation screen before activating a streaming application. Process 820B continues at step 1150, where control circuitry 604 responds to receiving user interaction with the user interface element by activating the associated application with the identified application context.

In some embodiments, the control circuitry 604 may to configure a user equipment device 704 to be a do not disturb mode based on the present operation of the control circuitry 604. For example, the control circuitry 604 may perform heuristic analysis of a user's preferred mode of operation of a device based on the operating conditions of the device. In some embodiments, the control circuitry 604 may, upon playback of a media asset, determine characteristics of the media asset and the operating characteristics of the device playing the media asset. For example, when a user plays a movie from a streaming service, the control circuitry 604 may obtain genre information about the movie and information about the devices current location. In some embodiments, the control circuitry 604 may analyze the applications active on a user equipment device 704 to determine the operating characteristics of a user equipment device 704. The control circuitry 604 may use semantical or syntactical analysis of information about a media asset, e.g. genres, actors, characters, sport's teams, publication year, or other information as previously describe to obtain relevant characteristics of the media asset. The control circuitry 604 may correlate the characteristics of the media asset and the operating characteristics of the device playing the media asset with the user's history for placing the device in a do not disturb mode based in similar characteristics. For example, the control circuitry 604 may use heuristics to analyze the user's history for placing a device into a do not disturb mode when playing similar content in a similar application to determine whether the present situation is one that correlates highly with placing the device in a do not disturb mode. For example, the control circuitry 604 may retrieve information a user profile that indicates when, for how long, and in what circumstances a user placed devices into do not disturb modes. Based on the correlation, the control circuitry 604 may automatically configure the device to be in a do not disturb mode. In some embodiments, the control circuitry 604 may provide a user interface to configure the user's preferences for automatically placing the device in a do not disturb mode. For example, the user may be presented with a list of different genres of content, different stream applications, different geographic locations and a setting for whether the user has a preference for placing the device into a do not disturb mode based on the respective options (e.g., a "yes", "no", or "no preference"). In such embodiments, the control circuitry 604 may combine a heuristic approach based on the user's past preferences with an approach based on the user's explicit preferences or may replace the heuristic approach with an approach based only on the user's explicit preferences. In some embodiments, the user's preferences take precedence over the heuristic approach.

In some embodiments, the control circuitry 604 may use the behaviors and preferences of other users, e.g., users from the user's social groups, to infer when to place the device in a do not disturb mode. For example, using techniques described above in reference to FIG. 11, the control circuitry 604 may retrieve a user's social graph and query a service, or user devices associated with users in the social graph, for information related to those user's behavior histories for configuring their own devices into do not disturb modes along with characteristics of contents and devices' operation conditions to train a heuristic model. The control circuitry 604 may infer one or more conditions from the other users' conditions are relevant to a user of the current device based on the relationship between the current user and the other users. For example, if a threshold number of members of the hockey social group place devices in a do not disturb mode when playing back a hockey games, the control circuitry 604 may infer that the current user would also prefer a device playing back a hockey game be automatically placed in do not disturb mode without using the current user's history or preferences. The control circuitry 604 may contain a hardcoded or configurable threshold number of users. For example, the control circuitry 604 may determine that is 50% of users in a social group configure devices into a do not disturb mode when watching content related, e.g. associated with related keywords, to the social group then the control circuitry 604 may place the user's device into do not disturb mode when playing the same content. The control circuitry 604 may provide a user interface allowing the user to customize the threshold.

Figure 12:
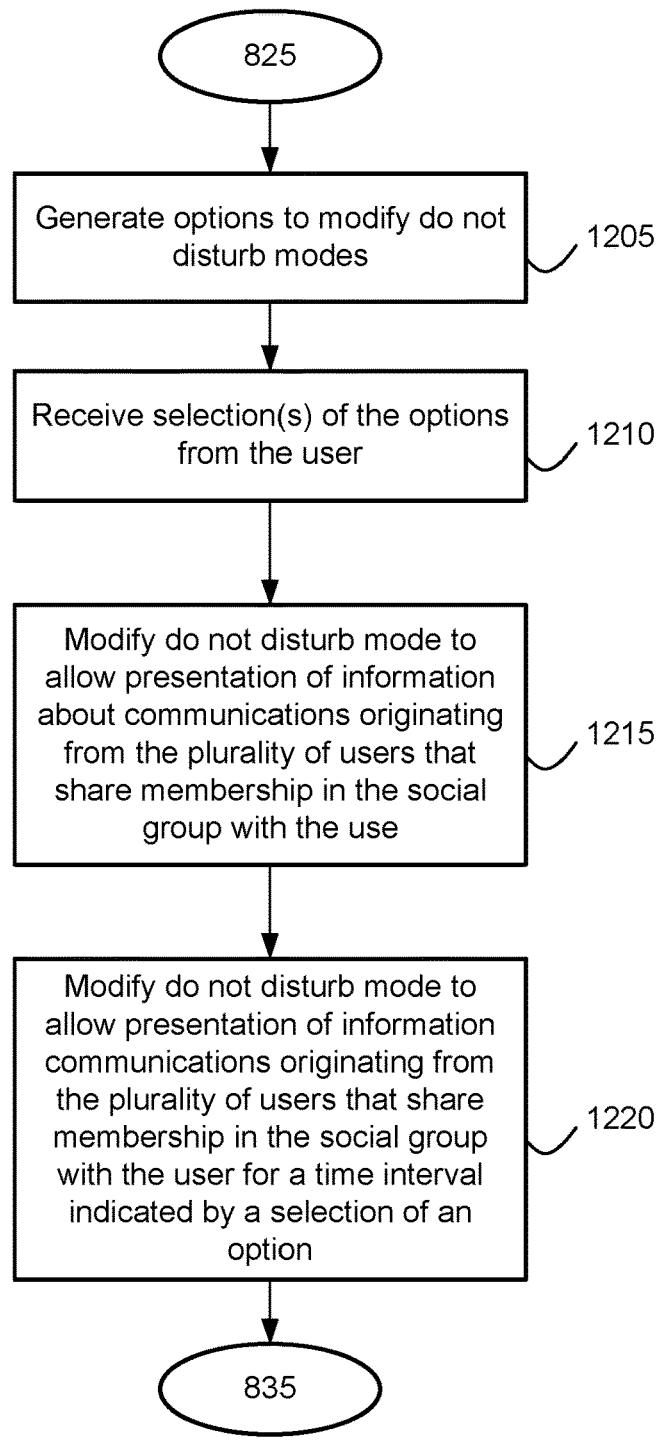
FIG. 12 depicts an illustrative flowchart of a process for overriding a mode of operation that prevents presentation of information about events in accordance with some embodiments of the disclosure.

FIG. 12 depicts an illustrative flowchart of a process for overriding a mode of operation that prevents presentation of information about events in accordance with some embodiments of the disclosure. Process 830A further depicts a method for overriding a mode of operation that prevents presentation of information about events, for example expanding from step 830 from FIG. 8. Process 830A begins at step 1205, where control circuitry 604 generates for display on the device an option that indicates modifications to the mode of operation that prevents presentation of information about events. For example, control circuitry 604 may generate a notification options interface 310 as depicted and described in FIG. 3. At step 1210, process 830A continues by receiving a selection of the option from the user. For example, the control circuitry 604 receives taps or clicks on the user interface elements. Process 830A continues at 1215 where control circuitry 604 responds to receiving the selection of the option by modifying the mode of operation to allow presentation of information about communications originating from the plurality of users that share membership in the social group with the user. In some embodiments, process 830A continues where control circuitry 604 modifies the mode of operation to allow presentation of information communications originating from the plurality of users that share membership in the social group with the user for a time interval indicated by a selection of an option, for example the depicted by "Yes (30 min)" option 316 as depicted in FIG. 3.

Figure 13:
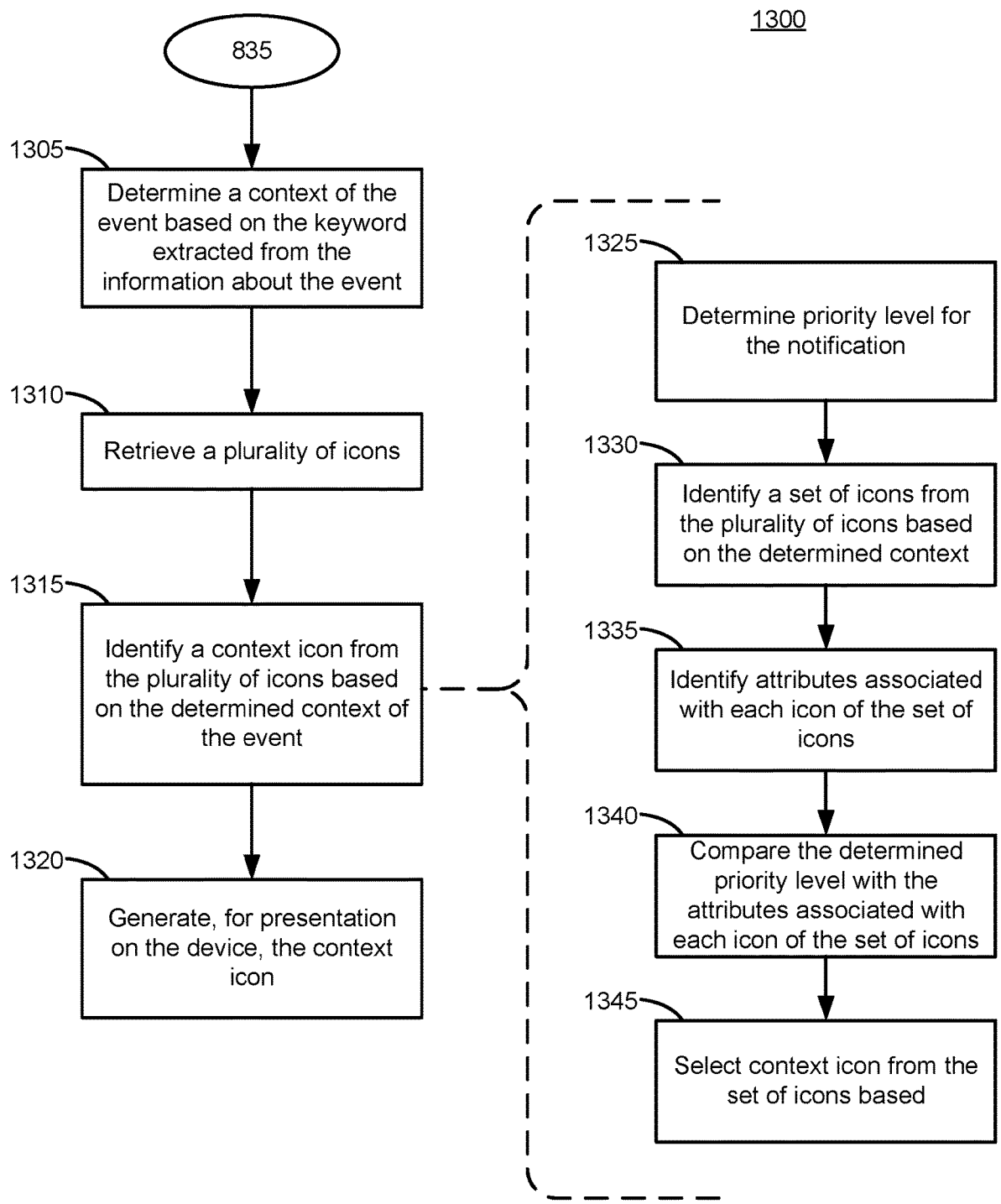
FIG. 13 depicts an illustrative flowchart of a process for generating a notification with a context icon for an event in accordance with some embodiments of the disclosure.

FIG. 13 depicts an illustrative flowchart of a process for generating a notification with a context icon for an event in accordance with some embodiments of the disclosure. Process 1300 may be executed by control circuitry 604 (e.g., in a manner instructed to control circuitry 604 by the media guidance application). Control circuitry 604 may be part of user equipment (e.g., a user equipment generating media guidance application 105, which may have any or all of the functionality of user television equipment 702, user computer equipment 704, and/or wireless communications device 706), or of a remote server separated from the user equipment by way of communication network 714, or distributed over a combination of both.

In some embodiments, presentation of the notification includes presentation of a context icon in accordance with process 1300. Process 1300 starts at 1305, where control circuitry 604 determines a context of the event based on the keyword extracted from the information about the event. For example, the control circuitry 604 may analyze the hockey keyword and determine that the event is related to sports or, more particularly, to ice hockey which is the context of the event. At step 1310, control circuitry 604 retrieves a plurality of icons. For example, the control circuitry 604 may maintain, or remotely access, a datastore, e.g., in storage 608, containing notification icons for different contexts including an email envelope, an image of a calendar, and an image of an ice hockey player. At step 1315, control circuitry 604 identifies a context icon from the plurality of icons based on the determined context of the event. For example, the control circuitry 604 may use a lookup table or other metadata to cross-reference the available icons with the identified context. At step 1320, process 1300 continues where control circuitry 604 generates, for presentation on the device, the context icon. For example, when generating a notification about the gold medal ice hockey game, the control circuitry 604 may include an icon, such as context icon 120, of an ice hockey player to represent the context of the notification.

In some embodiments, identifying a context icon includes determining an icon based on a priority level for the notification. For example, a notification for an event that is trending more popularly may be displayed in a color commensurate with the determined popularity. Therefore, control circuitry 604 may further identify a context icon at step 1315 according to the following process. Process 1300, may therefore, include step 13250 where control circuitry 604 determines a priority level for the notification based on the number of the plurality of communications and a time interval between the origination of a first of the plurality of communications and a last of the plurality of communications. Process 1300 continues at step 1330 where control circuitry 604 identifies a set of icons from the plurality of icons based on the determined context, the plurality of icons comprising the context icon. For example, the control circuitry 604 may identify several potential icons of an ice hockey player, based on the keyword, but each icon being in a different color such as green, yellow, and red. At step 1335, the control circuitry 604 continues process 1300 by identifying attributes associated with each icon of the set of icons. For example, the control circuitry 604 may identify an attribute of high priority for the red icon of hockey player, an attribute of medium priority for the yellow icon of hockey player, and an attribute of low priority for the green icon of hockey player. At step 1340, the control circuitry 604 continues process 1300 by comparing the determined priority level with the attributes associated with each icon of the set of icons. At step 1345, control circuitry 604 selects the context icon from the set of icons based on the comparison of the determined priority level with the attributes associated with each icon of the set of icons.

Figure 14:
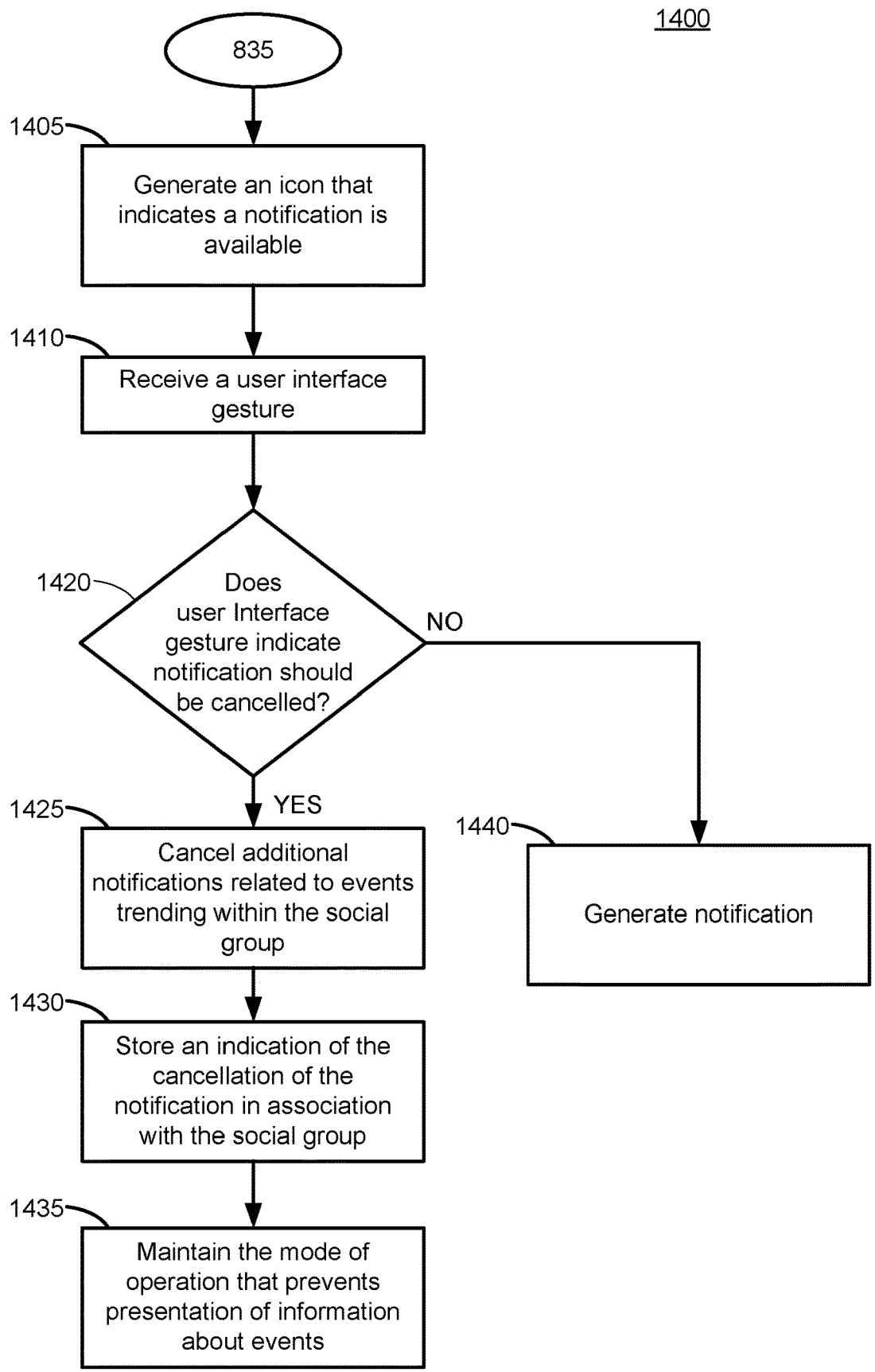
FIG. 14 depicts an illustrative flowchart of a process for presenting a user interface to control the presentation of a notification in accordance with some embodiments of the disclosure.

FIG. 14 depicts an illustrative flowchart of a process for presenting a user interface to control the presentation of a notification in accordance with some embodiments of the disclosure. Process 1400 may be executed by control circuitry 604 (e.g., in a manner instructed to control circuitry 604 by the media guidance application). Control circuitry 604 may be part of user equipment (e.g., a user equipment generating media guidance application 105, which may have any or all of the functionality of user television equipment 702, user computer equipment 704, and/or wireless communications device 706), or of a remote server separated from the user equipment by way of communication network 714, or distributed over a combination of both.

In some embodiments, presentation of the notification includes presentation of an interface to control presentation of a notification in accordance with process 1400. Process 1400 starts at 1405, where control circuitry 604 generates, for presentation on the device, an icon that indicates a notification is available. For example, the control circuitry 604 may display an icon on display 612 of user equipment 100 that indicates a notification is available, e.g., an icon of an ice hockey player to indicated that notification is available for the gold medal match for Woman's Ice Hockey between Team USA and Team Canada. At 1410, the control circuitry 604 continues process 1400 by receiving, from the user, a user interface gesture. For example, the user may click an appropriate button or swipe an appropriate direction to indicate either the user would like to view the notification or would like to cancel the notification using user input interface 610. The control circuitry 604 continues by determining whether the user interface gesture indicates the notification should be cancelled. at step 1420. For example, the user may use user input interface 610 to click an 'X' icon, a "Cancel" or "No" button, or swipe in a direction configured to indicate the notification should be cancelled. If the control circuitry 604 determines that the user interface gesture does not indicate that the notification should be cancelled, then the control circuitry 604 generates the notification at step 1440 in accordance with the descriptions herein.

If the control circuitry 604 determines that the user interface gesture indicates that the notification should be cancelled, then the control circuitry 604 continues process 1400 at step 1425 where the control circuitry 604 cancels additional notifications related to events trending within the social group. For example, the media guidance application may track the cancellation and use that information to prevent another related notification in the future. In some embodiments, process 1400 continues at step 1430, where the control circuitry 604 stores an indication of the cancellation of the notification in association with the social group. For example, the control circuitry 604 may store a configuration setting in storage 608 that indicates the user previously cancelled a notification for an event notification for a specific social group. If the control circuitry 604 later receives information about the same event, or another event related to that social group, the control circuitry 604 may infer that the user does not wish to supersede the do not disturb mode based on the previous notification cancellation. Therefore, process 1400 may continue at step 1435 by, in response to receiving information about a second event that is determined to be trending within the social group, maintaining the mode of operation that prevents presentation of information about events.

Figure 15:
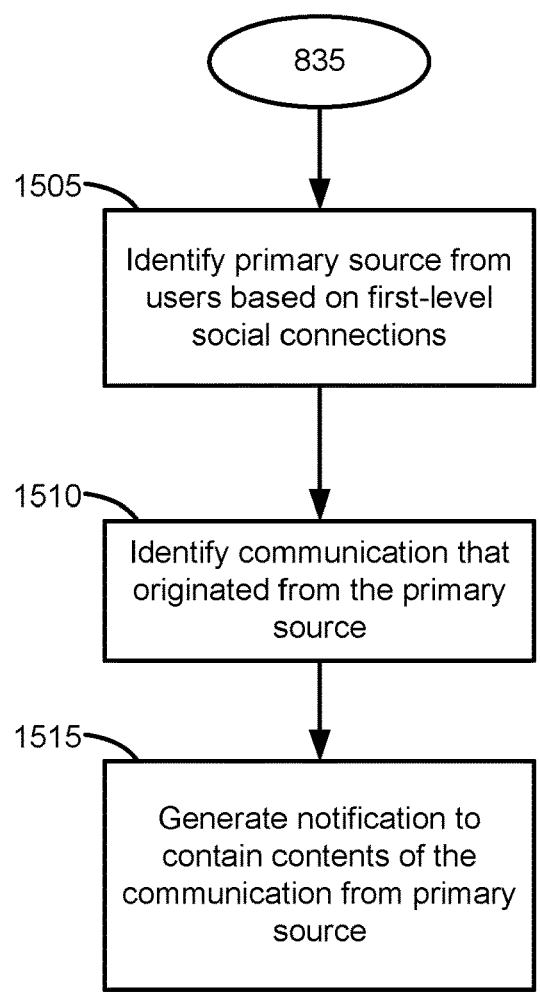
FIG. 15 depicts an illustrative flowchart of a process for generating a notification for an event in accordance with some embodiments of the disclosure.

FIG. 15 depicts an illustrative flowchart of a process for generating a notification for an event in accordance with some embodiments of the disclosure. Process 1500 may be executed by control circuitry 604 (e.g., in a manner instructed to control circuitry 604 by the media guidance application). Control circuitry 604 may be part of user equipment 100 (e.g., a user equipment generating media guidance application 105, which may have any or all of the functionality of user television equipment 702, user computer equipment 704, and/or wireless communications device 706), or of a remote server separated from the user equipment by way of communication network 714, or distributed over a combination of both.

In some embodiments, presentation of the notification includes presentation of contents of a communication received from an influencer in the user's social group in accordance with process 1500. Process 1500 starts at 1505, where control circuitry 604 identifies a primary source from the plurality of users in the user's social group based on the number social connections the primary source has with other users of the plurality of users. In some embodiments, the control circuitry 604 determines the number of first-level connections the primary has with other social users. As used herein, a first-level social connection is a direct connection between a user and other users. For example, a first-level social connection may be represented in a directed graph as a direct connection between two nodes with no intervening nodes. Within a single social group, a primary source, i.e., influencer may be determined as a user in the social group with the largest number of direct connections, i.e., first-level connection, to other nodes in the directed graph. In some embodiments, the primary source or influencer may be based on monitored reactions between a user and his source group. For example, a user may not have the most number of first-level connections but content that originates from that user may spread to other users and other social groups on a larger scale than other users, meaning their influence expands more broadly than other members of the social group.

Process 1500 may continue at step 1510 where control circuitry 604 identifies a communication from the plurality of communications that originated from the primary source. For example, the media guidance application 105 may locate a social message, e.g., a tweet, that came from the influencer via I/O path 602. At step 1515, control circuitry 604 continues process 1500 by generating the notification to contain contents of the communication that originated from the primary source.

Figure 16:
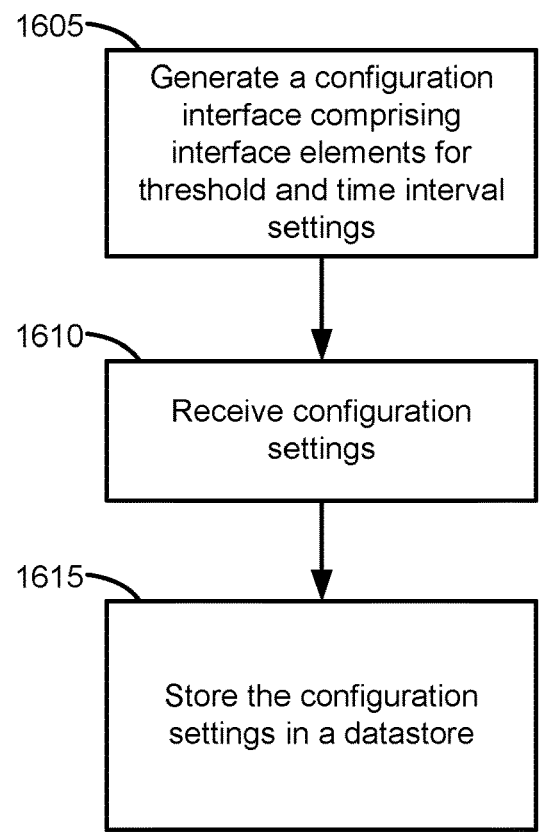
FIG. 16 depicts an illustrative flowchart of a process for configuring the presentation information about an event on a device that is in a mode of operation that prevents presentation of information about events in accordance with some embodiments of the disclosure.

FIG. 16 depicts an illustrative flowchart of a process for configuring the presentation information about an event on a device that is in a mode of operation that prevents presentation of information about events in accordance with some embodiments of the disclosure. Process 1600 may be executed by control circuitry 604 (e.g., in a manner instructed to control circuitry 604 by the media guidance application). Control circuitry 604 may be part of user equipment (e.g., a user equipment generating media guidance application 105, which may have any or all of the functionality of user television equipment 702, user computer equipment 704, and/or wireless communications device 706), or of a remote server separated from the user equipment by way of communication network 714, or distributed over a combination of both.

Process 1600 begins at step 1605, where control circuitry 604 generates, for presentation on the user equipment device 600, a configuration interface comprising interface elements for receiving configuration settings corresponding with the threshold number of the plurality of communications and the predetermined time interval required to determine the event is trending. For example, the control circuitry 604 may generate configuration interface 210 as depicted in FIG. 2. At step 1610, process 1600 continues with control circuitry 604 receiving, by user interactions with the configuration interface, the configuration settings. For example, the control circuitry 604 may receive a number of messages and amount of time for a specific social group. At 1615, process 1600 continues with control circuitry 604 storing, the configuration settings in a datastore.

Figure 17:
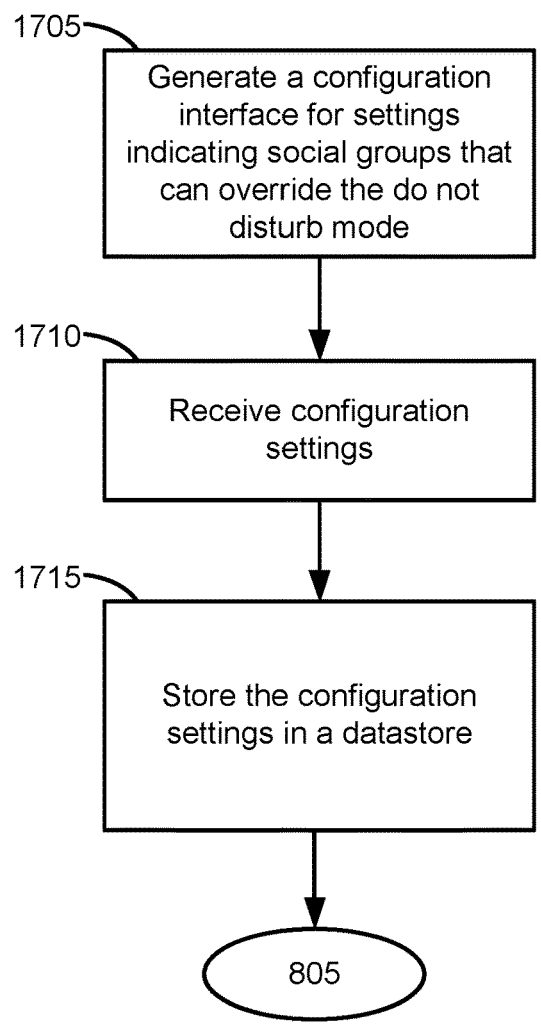
FIG. 17 depicts another illustrative flowchart of a process for configuring the presentation information about an event on a device that is in a mode of operation that prevents presentation of information about events in accordance with some embodiments of the disclosure.

FIG. 17 depicts another illustrative flowchart of a process for configuring the presentation information about an event on a device that is in a mode of operation that prevents presentation of information about events in accordance with some embodiments of the disclosure. Process 1700 may be executed by control circuitry 604 (e.g., in a manner instructed to control circuitry 604 by the media guidance application). Control circuitry 604 may be part of user equipment (e.g., a user equipment generating media guidance application 105, which may have any or all of the functionality of user television equipment 702, user computer equipment 704, and/or wireless communications device 706), or of a remote server separated from the user equipment by way of communication network 714, or distributed over a combination of both.

Process 1700 begins at step 1705, where control circuitry 604 generates, for presentation on the device, a configuration interface comprising interface elements for receiving configuration settings using, for example, user input interface 610, indicating a plurality of social groups to which the user is a member and whether trending events from each of the plurality of social groups can override the mode of operation that prevents presentation of information about events. For example, the control circuitry 604 may present a list of social groups along with a check box, or other selection element, for selecting whether notifications for that social group can supersede a do not disturb mode. At step 1710, control circuitry 604 continues process 1700 by receiving, through user interactions with the configuration interface, the configuration settings and at step 1715 stores the configuration settings in a datastore. Using these configuration settings, the control circuitry 604 may determine whether an event can override a mode of operation the prevents notifications, such as a do not disturb mode, based on the configuration settings. For example, when overriding the mode of operation that prevents presentation of information about events, the control circuitry 604 may further determine whether events trending in the determined social group of the plurality of the users are configured, based on the configuration settings, to override the mode of operation that prevents presentation of information about events.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for generating for presentation information about an event on a device that is in a mode of operation that prevents presentation of information about events, the method comprising:
   receiving, on the device, information about the event;
   in response to receiving the information about the event, determining whether the device is configured to be in a mode of operation that prevents presentation of information about events;
   in response to determining that the device is configured to be in a mode of operation that prevents presentation of information about events, determining whether the event is relevant to a user by:
   extracting a keyword from the information about the event;
   retrieving preferences of the user;
   comparing the keyword with the preferences; and
   determining, based on comparing the keyword with the preferences, that the event is relevant to the user;
   in response to determining that the event is relevant to the user, determining whether the event is trending among a plurality of users that share membership in a social group with the user by:
   identifying the plurality of users that share membership in the social group with the user based on comparisons of the keyword with social group attributes of each of the plurality of users;
   retrieving information about a plurality of communications that contain the keyword originating from the plurality of users; and
   determining whether a threshold number of the plurality of communications were sent within a predetermined time interval of one another;
   in response to determining that the event is trending among the plurality of users that share membership in the social group with the user, overriding the mode of operation that prevents presentation of information about events; and
   generating, for presentation on the device, a notification containing information about the event.

2. The method of claim 1, wherein overriding the mode of operation that prevents presentation of information about events further comprises:
   generating for display on the device an option that indicates modifications to the mode of operation that prevents presentation of information about events;
   receiving a selection of the option from the user; and
   in response to receiving the selection of the option, modifying the mode of operation to allow information about the event to be presented to the user.

3. The method of claim 2, wherein modifying the mode of operation to allow information about the event to be presented to the user further comprises modifying the mode of operation to allow presentation of information about communications originating from the plurality of users that share membership in the social group with the user.

4. The method of claim 3, wherein modifying the mode of operation to allow presentation of information about communications further comprises:
   receiving a second selection of a second option from the user; and
   in response to receiving the selection of the second option, modifying the mode of operation to allow presentation of information communications originating from the plurality of users that share membership in the social group with the user for a time interval indicated by a selection of a second option.

5. The method of claim 1, wherein generating, for presentation on the device, the notification containing information about the event further comprises:
   determining a context of the event based on the keyword extracted from the information about the event;
   retrieving a plurality of icons;
   identifying a context icon from the plurality of icons based on the determined context of the event; and
   generating, for presentation on the device, the context icon.

6. The method of claim 5, wherein identifying the context icon from the plurality of icons based on the determined context of the event further comprises:
   determining a priority level for the notification based on the number of the plurality of communications and a time interval between the origination of a first of the plurality of communications and a last of the plurality of communications;
   identifying a set of icons from the plurality of icons based on the determined context, the plurality of icons comprising the context icon;
   identifying attributes associated with each icon of the set of icons;
   comparing the determined priority level with the attributes associated with each icon of the set of icons; and
   selecting the context icon from the set of icons based on the comparison of the determined priority level with the attributes associated with each icon of the set of icons.

7. The method of claim 1, wherein generating, for presentation on the device, the notification containing information about the event further comprises:
   generating, for presentation on the device, an icon that indicates a notification is available;
   receiving, from the user, a user interface gesture;
   determining whether the user interface gesture indicates the notification should be cancelled; and
   in response to determining that the user interface gesture indicates the notification should be cancelled, cancelling additional notifications related to events trending within the social group, by:
   storing an indication of the cancellation of the notification in association with the social group; and
   in response to receiving information about a second event that is determined to be trending within the social group, maintaining the mode of operation that prevents presentation of information about events.

8. The method of claim 1, wherein generating, for presentation on the device, the notification containing information about the event further comprises:
- identifying a primary source from the plurality of users based on the number of first-level social connections the primary source has to other users of the plurality of users;
- identifying a communication from the plurality of communications that originated from the primary source; and
- generating the notification to contain contents of the communication that originated from the primary source.

9. The method of claim 1, further comprising:
- generating, for presentation on the device, a configuration interface comprising interface elements for receiving configuration settings corresponding with the threshold number of the plurality of communications and the predetermined time interval required to determine the event is trending;
- receiving, by user interactions with the configuration interface, the configuration settings; and
- storing the configuration settings in a datastore.

10. The method of claim 1, further comprising:
- generating, for presentation on the device, a configuration interface comprising interface elements for receiving configuration settings indicating a plurality of social groups to which the user is a member and whether trending events from each of the plurality of social groups can override the mode of operation that prevents presentation of information about events;
- receiving, by user interactions with the configuration interface, the configuration settings;
- storing the configuration settings in a datastore; and
- wherein, overriding the mode of operation that prevents presentation of information about events further comprises, determining whether events trending in the social group of the plurality of the users are configured, based on the configuration settings, to override the mode of operation that prevents presentation of information about events.

11. A system for generating for presentation information about an event on a device that is in a mode of operation that prevents presentation of information about events, the system comprising:
- communication circuitry; and
- control circuitry configured to:
  - receive, using the communication circuitry, information about the event;
  - in response to receiving the information about the event, determining whether the device is configured to be in a mode of operation that prevents presentation of information about events;
  - in response to determining that the device is configured to be in a mode of operation that prevents presentation of information about events, determine whether the event is relevant to a user by:
    - extracting a keyword from the information about the event;
    - retrieving, using the communication circuitry, preferences of the user;
    - comparing the keyword with the preferences; and
    - determining, based on comparing the keyword with the preferences, that the event is relevant to the user;
  - in response to determining that the event is relevant to the user, determine whether the event is trending among a plurality of users that share membership in a social group with the user by:
    - identifying the plurality of users that share membership in the social group with the user based on comparisons of the keyword with social group attributes of each of the plurality of users;
    - retrieving, using the communication circuitry, information about a plurality of communications that contain the keyword originating from the plurality of users; and
    - determining whether a threshold number of the plurality of communications were sent within a predetermined time interval of one another;
  - in response to determining that the event is trending among the plurality of users that share membership in the social group with the user, override the mode of operation that prevents presentation of information about events; and
  - generate, for presentation on the device, a notification containing information about the event.

12. The system of claim 11, wherein the control circuitry is further configured, when overriding the mode of operation that prevents presentation of information about events, to:
- generate for display on the device an option that indicates modifications to the mode of operation that prevents presentation of information about events;
- receive a selection of the option from the user; and
- in response to receiving the selection of the option, modify the mode of operation to allow information about the event to be presented to the user.

13. The system of claim 12, wherein the control circuitry is further configured, when modifying the mode of operation to allow information about the event to be presented to the user, to modify the mode of operation to allow presentation of information about communications originating from the plurality of users that share membership in the social group with the user.

14. The system of claim 13, wherein the control circuitry is further configured, when modifying the mode of operation to allow presentation of information about communications, to:
- receive a second selection of a second option from the user; and
- in response to receiving the selection of the second option, modify the mode of operation to allow presentation of information communications originating from the plurality of users that share membership in the social group with the user for a time interval indicated by a selection of a second option.

15. The system of claim 11, wherein the control circuitry is further configured, when generating, for presentation on the device, the notification containing information about the event, to:
- determine a context of the event based on the keyword extracted from the information about the event;
- retrieve, using the communication circuitry, a plurality of icons;
- identify a context icon from the plurality of icons based on the determined context of the event; and
- generate, for presentation on the device, the context icon.

16. The system of claim 15, wherein the control circuitry is further configured, when identifying the context icon from the plurality of icons based on the determined context of the event, to:
- determine a priority level for the notification based on the number of the plurality of communications and a time interval between the origination of a first of the plurality of communications and a last of the plurality of communications;
identify a set of icons from the plurality of icons based on the determined context, the plurality of icons comprising the context icon;
identify attributes associated with each icon of the set of icons;
compare the determined priority level with the attributes associated with each icon of the set of icons; and
select the context icon from the set of icons based on the comparison of the determined priority level with the attributes associated with each icon of the set of icons.

17. The system of claim 11, wherein the control circuitry is further configured, when generating, for presentation on the device, the notification containing information about the event, to:
generate, for presentation on the device, an icon that indicates a notification is available;
receive, from the user, a user interface gesture;
determine whether the user interface gesture indicates the notification should be cancelled; and
in response to determining that the user interface gesture indicates the notification should be cancelled, cancel additional notifications related to events trending within the social group, by:
storing an indication of the cancellation of the notification in association with the social group; and
in response to receiving information about a second event that is determined to be trending within the social group, maintaining the mode of operation that prevents presentation of information about events.

18. The system of claim 11, wherein the control circuitry is further configured, when generating, for presentation on the device, the notification containing information about the event, to:
identify a primary source from the plurality of users based on the number of first-level social connections the primary source has to other users of the plurality of users;
identify a communication from the plurality of communications that originated from the primary source; and
generate the notification to contain contents of the communication that originated from the primary source.

19. The system of claim 11, wherein the control circuitry is further configured to:
generate, for presentation on the device, a configuration interface comprising interface elements for receiving configuration settings corresponding with the threshold number of the plurality of communications and the predetermined time interval required to determine the event is trending;
receive, by user interactions with the configuration interface, the configuration settings; and
store the configuration settings in a datastore.

20. The system of claim 11, wherein the control circuitry is further configured to:
generate, for presentation on the device, a configuration interface comprising interface elements for receiving configuration settings indicating a plurality of social groups to which the user is a member and whether trending events from each of the plurality of social groups can override the mode of operation that prevents presentation of information about events;
receive, by user interactions with the configuration interface, the configuration settings;
store the configuration settings in a datastore; and
when overriding the mode of operation that prevents presentation of information about events further comprises, determine whether events trending in the social group of the plurality of the users are configured, based on the configuration settings, to override the mode of operation that prevents presentation of information about events.

* * * * *